United States Patent [19]

Lokhandwala

[11] Patent Number: 5,647,227
[45] Date of Patent: Jul. 15, 1997

[54] MEMBRANE-AUGMENTED CRYOGENIC METHANE/NITROGEN SEPARATION

[75] Inventor: Kaaeid Lokhandwala, Menlo Park, Calif.

[73] Assignee: Membrane Technology and Research, Inc., Menlo Park, Calif.

[21] Appl. No.: 608,707

[22] Filed: Feb. 29, 1996

[51] Int. Cl.[6] .................................................. F25J 1/00
[52] U.S. Cl. ........................ 62/624; 62/927; 95/50; 96/4; 96/8
[58] Field of Search ...................... 62/624, 927; 95/50, 95/51, 52; 96/4, 8

[56] References Cited

U.S. PATENT DOCUMENTS

| | | | |
|---|---|---|---|
| 4,374,657 | 2/1983 | Schendel et al. | 62/19 |
| 4,511,382 | 4/1985 | Valencia et al. | 62/20 |
| 4,529,411 | 7/1985 | Goddin, Jr. et al. | 55/16 |
| 4,595,405 | 6/1986 | Agrawal et al. | 62/18 |
| 4,599,096 | 7/1986 | Burr | 62/27 |
| 4,602,477 | 7/1986 | Lucadamo | 62/24 |
| 4,639,257 | 1/1987 | Duckett et al. | 55/16 |
| 4,654,063 | 3/1987 | Auvil et al. | 62/18 |
| 4,681,612 | 7/1987 | O'Brien et al. | 62/23 |
| 4,687,498 | 8/1987 | Maclean et al. | 62/17 |
| 4,689,062 | 8/1987 | Maclean et al. | 62/18 |
| 4,755,193 | 7/1988 | Higashimura et al. | 55/16 |
| 4,793,841 | 12/1988 | Burr | 62/27 |
| 4,936,887 | 6/1990 | Waldo et al. | 62/24 |
| 5,013,338 | 5/1991 | Anand et al. | 55/158 |
| 5,053,067 | 10/1991 | Chretien | 62/624 |
| 5,071,451 | 12/1991 | Wijmans | 55/16 |
| 5,089,033 | 2/1992 | Wijmans | 55/16 |
| 5,199,962 | 4/1993 | Wijmans | 55/16 |
| 5,205,843 | 4/1993 | Kaschemekat et al. | 95/16 |
| 5,281,255 | 1/1994 | Toy et al. | 96/50 |
| 5,332,424 | 7/1994 | Roa et al. | 62/624 |
| 5,352,272 | 10/1994 | Moll et al. | 96/9 |
| 5,374,300 | 12/1994 | Kaschemekat et al. | 95/39 |
| 5,414,190 | 5/1995 | Förg et al. | 585/802 |

OTHER PUBLICATIONS

Gottschlich et al., "Energy Minimization of Separation Processes using Conventional Membrane/Hybrid Systems," Final Report to DOE, 1990.

Tanaka et al., "Permeability and Permselectivity of Gases in Fluorinated and Non-Fluorinated Polyimides," Polymer, vol. 33, p. 585, 1992.

Coleman et al., "The Transport Properties of Polyimide Isomers Containing Hexafluoroisopropylidene in the Diamine Residue," J. Memb. Sci., vol. 50, p. 1915, 1990.

Kim et al., "Relationship Between Gas Separation Properties and Chemical Structure in a Series of Aromatic Polyimides," J. Memb. Sci., vol. 37, p. 45, 1988.

Stern et al., "Structure-Permeability Relationships in Silicone Polymers," J. Polymer Sci., vol. 25, p. 1263, 1987.

Koros et al., "Sorption and Transport of Various Gases in Poly-Carbonate," J. Memb. Sci., vol. 2, p. 165, 1977.

Plate et al., "Gas and Vapor Permeation and Sorption in Poly (trimethylsilylpropyne)", J. Memb. Sci., vol. 60, p. 13, 1991.

Baker et al., "Nitrogen Separation from Natural Gas Using Membranes," Presented to AIChE, Houston, TX, Feb. 1993.

Toy et al., "Gas Transport Through Poly(1-Trimethylsilyl-1-Propyne) Membranes in the Presence of Organic Vapors," Presented at NAMS, Breckenridge, CO, May 1994.

Pinnau, "Membrane Material Selection for the Separation of Condensable Gases," Presented at GKSS Research Center, Sep. 1995.

Pinnau et al., "Poly(1-Trimethylsilyl-1-Propyne)-Superglassy Polymer w/ Extraordinary Properties for Sep. of Organic Vapors from the Permanent Gases, " Presented at NAMS, Portland, OR, May 1995.

Primary Examiner—Ronald C. Capossela
Attorney, Agent, or Firm—J. Farrant

[57] ABSTRACT

A membrane separation process combined with a cryogenic separation process for treating a gas stream containing methane, nitrogen and at least one other component. The membrane separation process works by preferentially permeating methane and the other component and rejecting nitrogen. The process is particularly useful in removing components such as water, carbon dioxide or $C_{3+}$ hydrocarbons that might otherwise freeze and plug the cryogenic equipment.

63 Claims, 10 Drawing Sheets

MEMBRANE-AUGMENTED CRYOGENIC METHANE/NITROGEN SEPARATION

This invention was made in part with Government support under Contract Number DE-FG03-94ER81809, awarded by the U.S. Department of Energy. The Government has certain rights in this invention.

FIELD OF THE INVENTION

The invention concerns the separation of nitrogen from methane by cryogenic distillation. More particularly, the invention concerns cryogenic separation preceded by membrane separation.

BACKGROUND OF THE INVENTION

The amount of nitrogen that is acceptable in pipeline-quality natural gas depends on several factors. Natural gas pipeline specification is typically no more than 4% total inerts. This may mean no more than about 4% nitrogen if no other inert components are present, but less, 2% or 3% nitrogen for example, if the stream also contains carbon dioxide, helium or argon. If purer methane is required, the target nitrogen content may obviously be lower.

Fourteen percent of known U.S. natural gas reserves contain more than 4% nitrogen. The bulk of these reserves cannot be exploited because no economical technology for removing the nitrogen exists.

Cryogenic distillation is the only process being used to date on any scale to remove nitrogen from methane in natural or associated gas. Twelve such plants are believed to be in operation in the U.S., for example in enhanced oil recovery, where nitrogen is used to pressurize the formation and tends to build up in the associated gases removed with the oil. The gas streams that have been treated by cryogenic separation contain relatively large amounts of nitrogen, such as more than 10 vol %. Cryogenic plants can be cost effective in these applications because all the separated products have value. The propane, butane and heavier hydrocarbons can be recovered as natural gas liquids (NGL), the methane/ethane stream can be delivered to the gas pipeline and the nitrogen can be reinjected into the formation.

Cryogenic plants are not used more widely because they are expensive and complicated. A particular complication is the need for significant pretreatment to remove water vapor, carbon dioxide, and $C_{3+}$ hydrocarbons and aromatics to avoid freezing of these components in the cryogenic section of the plant, which typically operates at temperatures down to $-150°$ C. The degree of pretreatment is far more elaborate and the demands placed upon it are far more stringent than would be required to render the gas acceptable in the pipeline grid absent the excess nitrogen content. For example, pipeline specification for water vapor is generally about 120 ppm; to be fit to enter a cryogenic plant, the gas must contain no more than 1-2 ppm of water vapor at most. Similarly, 2% carbon dioxide content may pass muster in the pipeline, whereas carbon dioxide may be present only at the level of 100 ppm or less for cryogenic separation.

Gas separation by means of membranes is known. For example, numerous patents describe membranes and processes for separating oxygen or nitrogen from air, hydrogen from various gas streams and carbon dioxide from natural gas. Such processes are in industrial use, using glassy membranes. Rubbery membranes are used to separate organic components from air or other gas mixtures, such as in resource recovery and pollution control.

It is also known to combine membrane separation with cryogenic distillation. For example, the following U.S. patents show such processes for the separation of carbon dioxide from methane: U.S. Pat. No. 4,529,411; 4,511,382; 4,639,257; 4,599,096; 4,793,841; 4,602,477; 4,681,612; 4,936,887 and 5,414,190. U.S. Pat. No. 4,374,657 shows a combination of cryogenic distillation and membrane separation for separating ethane from carbon dioxide. U.S. Pat. No. 4,654,063 shows cryogenic separation followed by membrane separation for separating hydrogen from other gases. U.S. Pat. No. 4,595,405 shows a similar arrangement for separation of nitrogen and oxygen from air. U.S. Pat. Nos. 4,687,498 and 4,689,062 show process designs combining membrane separation and cryogenic distillation for recovery of argon from ammonia plant purge gas mixtures.

A report by SRI to the U.S. Department of Energy ("Energy Minimization of Separation Processes using Conventional Membrane/Hybrid Systems", D. E. Gottschlich et al., Final Report under Contract number DE 91-004710, 1990) suggests that separation of nitrogen from methane might be achieved by a hybrid membrane/pressure swing adsorption system. The report shows and considers several designs, assuming that a hypothetical nitrogen-selective membrane, with a selectivity for nitrogen over methane of 5 and a transmembrane methane flux of $1 \times 10^{-6}$ cm$\cdot$(STP)/cm$^2\cdot$s$\cdot$cmHg, were to become available, which to date it has not.

In fact, there are several difficulties associated with separating nitrogen from methane by means of membranes, the main one being the absence of membranes with a useful selectivity. Both glassy and rubbery membranes have poor selectivities for nitrogen over methane or methane over nitrogen. Table 1 lists some representative values.

TABLE 1

| Polymer | Permeability (Barrer) | | Selectivity (—) | | Ref. |
|---|---|---|---|---|---|
| | $N_2$ | $CH_4$ | $N_2/CH_4$ | $CH_4/N_2$ | |
| Polyimide (6FDA-mp'ODA) | 0.26 | 0.13 | 2.1 | 0.5 | 1 |
| Polyimide (6FDA-BAHF) | 3.10 | 1.34 | 2.3 | 0.4 | 1 |
| Polyimide (6FDA-IPDA) | 1.34 | 0.70 | 1.9 | 0.5 | 2 |
| Polyimide (6FDA-MDA) | 0.20 | 0.10 | 2.0 | 0.5 | 3 |
| Cellulose acetate | 0.35 | 0.43 | 0.8 | 1.2 | 4 |
| Polycarbonate | 0.37 | 0.45 | 0.8 | 1.2 | 4 |
| Polysulfone | 0.14 | 0.23 | 0.6 | 1.7 | 4 |
| Poly(dimethylsiloxane-dimethylstyrene) | 103 | 335 | 0.3 | 3.3 | 4 |
| Poly(dimethylsiloxane) | 230 | 760 | 0.3 | 3.3 | 4 |
| Poly(siloctylene-siloxane) | 91 | 360 | 0.25 | 4.0 | 5 |
| Poly(p-silphenylene-siloxane) | 3 | 12 | 0.25 | 4.0 | 5 |
| Polyamide-polyether copolymer | 4.8 | 20 | 0.24 | 4.2 | 4 |

1 Barrer = $10^{-10}$ cm$^3$(STP) $\cdot$ cm/cm$^2$ $\cdot$ s $\cdot$ cmHg

References for table:
1. K. Tanaka, H. Kita, M. Okano, and K. Okamoto, "Permeability and Permselectivity of Gases in Fluorinated and Non-fluorinated Polyimides," Polymer 33, 585 (1992).
2. M. R. Coleman and W. J. Koros, "Isomeric Polyimides Based on Fluorinated Dianhydrides and Diamines for Gas Separation Applications," J. Memb. Sci. 50, 285 (1990).
3. T. H. Kim, W. J. Koros, C. R. Husk, and K. C. O'Brien, "Relationship Between Gas Separation Properties and Chemical Structures in a Series of Aromatic Polyimides,"J. Memb. Sci. 37, 45 (1988).
4. J. G. Wijmans, "Membrane Processes and Apparatus for Removing Vapors from Gas Streams," U.S. Pat. No. 5,071,451 (December 1991)
5. S. A. Stern, V. M. Shah, and B. J. Hardy, "Structure Permeability Relationships in Silicone Polymers," J. Polymer Sci: Polymer Physics Ed. 25, 1263, (1987).

These separation properties are not good enough to make membrane separation practical for this gas pair. With a nitrogen-selective membrane, it has been calculated below that a nitrogen/methane selectivity of about 15 is needed for a practical process that achieves adequate nitrogen removal and at the same time that avoids losing excessive amounts of methane into the permeate stream.

U.S. Pat. No. 5,352,272, to Dow Chemical, concerns operation of glassy membranes at subambient temperatures to improve selectivity for one gas over another. To achieve an acceptable selectivity for nitrogen over methane using known membrane materials would need an increase over the room-temperature selectivities shown in Table 1 of at least five-fold and more probably seven-fold or eight-fold. It is probable that the methane in the stream would liquefy before a low enough temperature to achieve this selectivity could be reached. Also, in glassy membranes, permeability, which is dominated by the diffusion coefficient, declines with decreasing temperature, so permeabilities, already low, would rapidly decline to an unacceptably low value.

Membrane separations are usually driven by a pressure difference between the feed and permeate sides, the feed side being at high pressure with respect to the permeate side. With a methane-selective membrane, if the bulk of the gas stream being treated has to pass to the permeate low-pressure side, then be recompressed, it is to be expected that this would make for an inefficient and hence costly process. Likewise, the membrane area that is needed to perform the separation is in proportion to the amount of gas that must cross the membrane; if most of the gas in the feed has to permeate the membrane, a much larger membrane area will be needed than if only a few percent of the feed gas has to permeate.

Thus, the separation of nitrogen from methane by means of membranes is a very difficult problem and has not, to applicants' knowledge, been previously attempted, either as a stand-alone operation or in conjunction with other separation techniques.

SUMMARY OF THE INVENTION

In one aspect, the invention is a process for treating a gas stream, typically, but not necessarily, natural gas, containing methane, nitrogen and at least one other component. The process comprises a membrane separation step followed by a cryogenic separation step.

The membrane step works by preferentially permeating methane and one or multiple components that might affect the cryogenic separation, and by rejecting the nitrogen component of the stream. Thus, the residue or reject stream from the membrane separation step is a substantially two-component nitrogen/methane mixture, from which other condensable or freezable constituents have been removed. Where ethane is present in the raw stream, it will also be present to some extent in the residue stream and will liquefy with the methane in the cryogenic process.

The process of the invention has significant advantages over cryogenic distillation alone. A moderately sized membrane system can reduce the volume flow of gas to the cryogenic unit substantially, thereby reducing the required capacity of the unit. Furthermore, the membrane separation step can substantially replace, or at least reduce, the complex and costly pretreatment train that is normally required upstream of a cryogenic distillation unit.

For example, if the gas stream to be treated is natural gas containing carbon dioxide, water and $C_{3+}$ hydrocarbons, these components represent contaminants that could freeze under the cryogenic process conditions and must be removed to very low levels before the cryogenic nitrogen/ methane separation is performed. The pretreatment steps might typically include chemical scrubbing to remove acid gases, molecular sieving and/or glycol absorption to remove water, and condensation to remove $C_{3+}$ hydrocarbons. In the process of the invention, a membrane is used that is preferentially permeable to all of these components over nitrogen. Depending on the initial composition of the gas stream to be treated, in some cases no additional treatment is required before the gas can enter the cryogenic separation step. In other cases, fewer, smaller or simpler additional treatment steps than were previously needed are possible.

In this aspect, the separation process of the invention comprises:

(a) providing a membrane having a feed side and a permeate side and being selective for both methane and one other component over nitrogen;

(b) passing the gas stream to be treated across the feed side of the membrane at a temperature at which the membrane exhibits the target selectivity for methane over nitrogen;

(d) withdrawing from the feed side a residue stream depleted in both methane and the other component and enriched in nitrogen compared with the raw gas stream;

(e) withdrawing from the permeate side a permeate stream enriched in both methane and the other component and depleted in nitrogen compared with the raw gas stream;

(f) subjecting the residue stream to cryogenic separation of nitrogen from methane.

In a second aspect, the invention can be useful, even when only two components, methane and nitrogen, are present. In this case, the membrane separation step serves principally to reduce the load on the cryogenic separation step, and/or as a means for enabling a portion of the gas stream to bypass the cryogenic separation step.

To achieve useful separation results in any aspect or embodiment, the membranes should preferably exhibit a methane/nitrogen selectivity of at least about 4, more preferably about 5 or more. It has been found that such a target selectivity can be achieved for rubbery materials by cooling, preferably down to no more than about $-50°$ C. Furthermore, this selectivity is accompanied by high methane transmembrane flux, such as at a very minimum at least about $1 \times 10^{-6}$ cm$^3$(STP)/cm$^2$.s.cmHg, preferably at least $1 \times 10^{-5}$ cm$^3$(STP)/cm$^2$.s.cmHg and more preferably at least $1 \times 10^{-4}$ cm$^3$(STP)/cm$^2$.s.cmHg.

The process of the invention can be carried out with two types of membranes. The first is rubbery membranes. The second is membranes made from the so-called "super-glassy" polymers, defined and described in the Detailed Description of the Invention below, that exhibit anomalous behavior for glassy materials in that they preferentially permeate larger, more condensable molecules over smaller, less condensable molecules.

In another aspect, the invention is a novel apparatus combination for carrying out gas treatment processes. In its most basic form, the apparatus of the invention comprises:

(a) a cryogenic separation unit adapted to separate nitrogen from methane, and (b) a membrane separation unit positioned upstream of the cryogenic separation unit, connected to the cryogenic separation unit such that a residue gas stream from the membrane separation unit can pass to the cryogenic separation unit for separation of nitrogen from methane.

The membrane separation unit is characterized in that it contains a membrane that exhibits, at a temperature no lower than about $-70°$ C.:

(i) the chosen target selectivity for methane over nitrogen, (ii) a transmembrane methane pressure-normalized flux of at least about $1\times10^{-6}$ cm$^3$(STP)/cm$^2$.s.cmHg, and (iii) a selectivity in favor of at least one other gas component over nitrogen.

It is an object of the invention to provide improved cryogenic processes for separation of nitrogen from methane.

It is an object of the invention to improve pretreatment of gas streams subjected to cryogenic distillation.

It is an object of the invention to combine membrane-based nitrogen/methane separation with cryogenic nitrogen/methane separation in an efficient way.

It is an object of the invention to provide an apparatus suitable for separating nitrogen from methane.

Additional objects and advantages will be apparent from the description of the invention to those skilled in the gas separation arts.

DETAILED DESCRIPTION OF THE INVENTION

Figure 1:
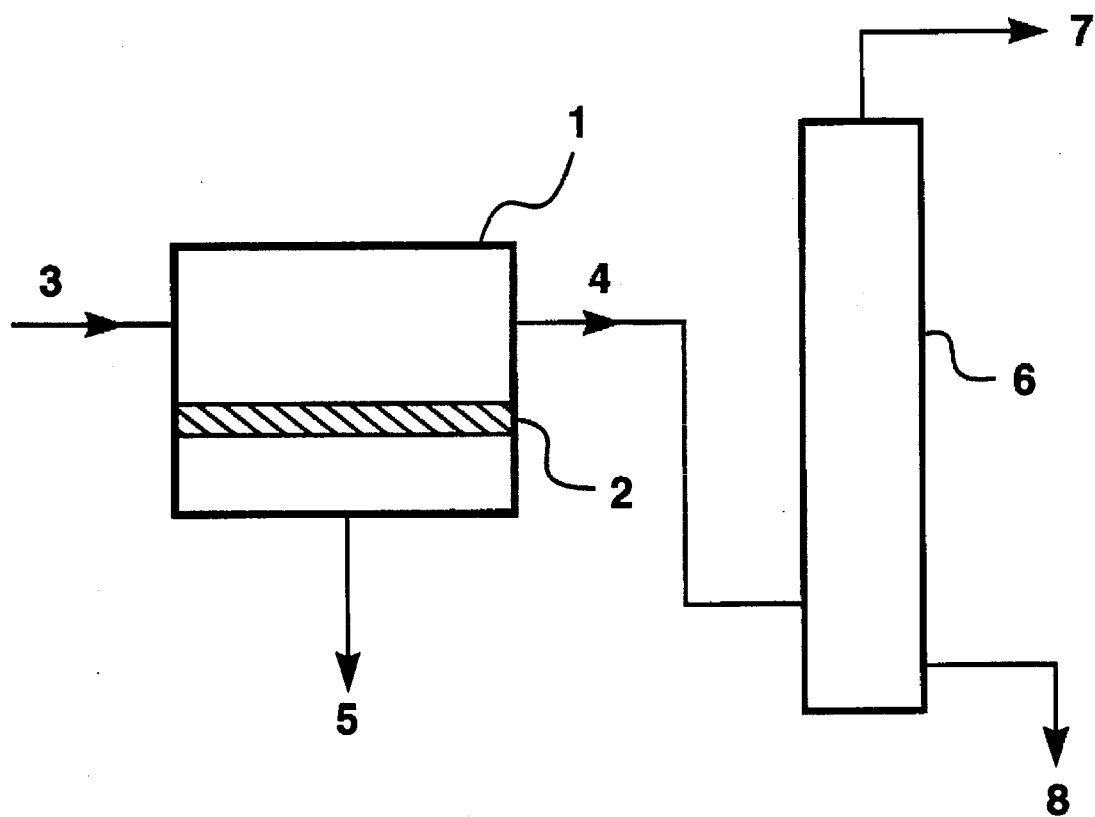
FIG. 1 is a schematic drawing illustrating the process of the invention in its most basic form.

As used herein, gas means gas or vapor.

As used herein, $C_{3+}$ hydrocarbon means a straight-chain or branched chain saturated or unsaturated hydrocarbon having three or more carbon atoms.

In one aspect, the invention is a process for treating a gas stream containing methane, nitrogen and one or more other components. The process comprises a membrane separation step followed by a cryogenic separation step.

The effects of the membrane separation step are two-fold:

(i) To remove contaminants that might interfere with the operation of the cryogenic nitrogen/methane separation unit, such as by freezing out during refrigeration prior to entry into the distillation column or within the distillation column itself.

(ii) To reduce the volume of gas to be treated by cryogenic separation.

The membrane step works by preferentially permeating methane and one or more of the potential contaminants, and rejecting nitrogen. In its most basic aspect, the membrane separation step involves running a feed stream containing these components across the feed side of a membrane that is selective in favor of methane over nitrogen. A driving force for transmembrane permeation is provided by a superatmospheric pressure on the feed side, a subatmospheric pressure on the permeate side, or both.

A residue stream depleted in methane and any preferentially permeating contaminant and enriched in nitrogen compared with the feed is withdrawn from the feed side of the membrane. A permeate stream enriched in methane and any preferentially permeating contaminant and depleted in nitrogen is withdrawn from the permeate side.

Since the membrane step works by preferentially permeating methane and rejecting nitrogen, this means that, for many streams, the major component of the stream is permeated and the minor component is rejected. For natural gas processing, this is unusual, and at first sight unattractive, because the major component of the stream is permeated and the minor component is rejected. Thus, the stage-cut and membrane area needed to carry out the process are relatively large. Also, the methane-enriched stream is recovered from the membrane at low pressure and needs recompression if it is to enter a gas pipeline. I have discovered that, despite these apparent disadvantages, such a process can be very advantageously combined with cryogenic separation to meet specific gas-treatment targets.

The membrane separation step relies on being able to achieve a selectivity, in gas mixtures, of at least about 4, more preferably at least about 5, yet more preferably at least about 5.5 or most preferably at least about 6 or more for methane over nitrogen. Most membranes that have been used in the past in the gas industry, such as cellulose acetate membranes for removing carbon dioxide from methane, are not suitable. Neither are any other conventional glassy membranes, which exhibit slight selectivity in favor of nitrogen over methane.

To my knowledge, there are no reports of membrane materials being able to achieve these target mixed gas methane/nitrogen selectivities at room temperature (20° C.).

Without wishing to be bound by theory, it is believed that the invention can best be understood starting from a brief theoretical explanation of permeation in polymer materials. A synthetic polymer membrane separates the components of a gas or vapor mixture because the components permeate the membrane at different rates. The permeability, P [cm$^3$(STP) .cm/cm$^3$.s.cmHg], of a polymer membrane material for a gas is defined as the rate at which that gas moves through a standard thickness [1 cm] of the material under a standard driving force [a pressure difference of 1 cmHg]. A measure of the ability of a membrane to separate two gases is the selectivity, $\alpha$, defined as the ratio of the gas permeabilities, $P_1/P_2$. Selectivity can also be expressed as:

$$\alpha = \frac{D_1}{D_2} \cdot \frac{k_1}{k_2}$$

where D is the diffusion coefficient of the gas in the membrane [cm$^2$/s], which is a measure of the gas mobility, and k is the Henry's law sorption coefficient, which links the concentration of the gas in the membrane material to the pressure in the adjacent gas [cm$^3$(STP)/cm$^3$.cmHg]. The intrinsic selectivity of a polymer material is established by measuring the permeabilities with pure gas or vapor samples, then calculating the ratio. The actual selectivity obtained in a real separation process is established by making permeation measurements with gas mixtures.

The ratio $D_1/D_2$ is the ratio of the diffusion coefficients of the two gases and can be viewed as the mobility selectivity, reflecting the different sizes of the two molecules. The ratio $k_1/k_2$ is the ratio of the Henry's law solubility coefficients of the two gases and can be viewed as the solubility selectivity, reflecting the relative condensabilities of the two gases.

In all polymer materials, the diffusion coefficient decreases with increasing molecular size. Hence, the mobility component of the selectivity always favors the passage of small molecules over large ones. The solubility component of the selectivity, on the other hand, is a measure of the energy required for sorption and normally increases with molecular diameter, because larger molecules are normally more condensable than smaller ones. The combined effect of these two factors determines the selectivity of the membrane.

The balance between mobility selectivity and solubility selectivity is different for glassy and rubbery polymers. In glassy polymers, the diffusion term is usually dominant, permeability falls with increasing permeant size and the material is selective for small molecules over large ones. In rubbery polymers, the solubility term is usually dominant, permeability increases with increasing permeant size and the material is selective for large molecules over smaller ones. The molecular kinetic diameters of nitrogen (3.64 Å) and methane (3.8 Å) are similar, and methane has a critical temperature of $-82.6°$ C., so is only moderately more soluble than nitrogen in most polymer materials. The slightly smaller molecular size of nitrogen means that glassy materials slightly favor the passage of nitrogen over methane. The relative condensability of methane means that rubbery materials slightly favor the passage of methane over nitrogen. As a result of the similar molecular sizes and the poor condensability of both components, however, both glassy and rubbery membrane materials have poor selectivity for this gas pair, as was illustrated in Table 1.

However, it has been found that, with cooling, the target methane/nitrogen selectivity of about 4, 5 or more is obtainable with gas mixtures in certain rubbery polymer membranes. In addition, it has been found that such selectivities can be accompanied by usefully high transmembrane methane fluxes, such as at a very minimum at least about $1 \times 10^{-6}$ $cm^3(STP)/cm^2.s.cmHg$, preferably at least $1 \times 10^{-5}$ $cm^3(STP)/cm^2.s.cmHg$ and more preferably at least $1 \times 10^4$ $cm^3(STP)/cm^2.s.cmHg$.

Types of rubbers for making membranes for use in the invention are, therefore, those that can reach the target of a mixed gas methane/nitrogen selectivity of at least about 4, more preferably at least about 5, combined with a transmembrane methane flux of at least about $1 \times 10^{-6}$ $cm^3(STP)/cm^2.s.cmHg$ at an appropriate temperature.

As can be seen from the brief explanation of the solution/diffusion transport mechanism above, it is important that the material to be used remains rubbery under the temperature conditions at which it is used, so that the separation remains dominated by the sorption or solubility term. As the temperature is reduced from 20° C., rubbery membranes at first become more methane selective with falling temperature. The transmembrane fluxes of both gases fall, but the loss in methane flux is small compared with the loss in nitrogen flux, so that the selectivity increases. As the temperature is decreased further, the membrane material begins to lose flexibility and the balance of the sorption and diffusion components of the selectivity shifts in favor of the diffusion term, so that the material now becomes less methane-selective, rather than more, as the temperature falls. In some materials the properties may alter to such an extent that the material becomes nitrogens selective, even considerably above the nominal glass-transition temperature. Thus, the operating temperature of the invention should preferably be at least 30° C. above the glass-transition temperature of the rubbery membrane material, more preferably at least 40° C. above and most preferably at least 50° C. or more above.

On the other hand, since it is the difference between the sorption of methane and nitrogen that provides the selectivity, it is desirable to take advantage of a low operating temperature to enhance this difference.

Considering the need to balance these two contradictory factors, the preferred appropriate operating temperature for the process of the invention is between 0° C. and $-100°$ C., more preferably between about $-10°$ C. and $-80°$ C. and most preferably between about $-20°$ C. and $-70°$ C. Specifically, it is preferred to operate, where possible, at temperatures no lower than about $-40°$ C., $-50°$ C., $-60°$ C. or $-70°$ C. The choice of operating temperature is influenced to some extent, of course, by the particular transport properties of the membrane material used.

The preferred rubbers for making membranes for use in the invention are those that meet the selectivity and flux targets and that have a glass transition temperature $(T_g)$ at 1 atmosphere pressure of below $-50°$ C., more preferably below $-80°$ C. and most preferably below $-100°$ C.

Specific, but non-limiting, preferred rubbery materials that have been found to be within the scope of this definition include siloxane polymers, particularly the polymers having repeating units having the structure:

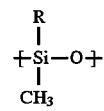

wherein R is an alkyl group having one to eight carbon atoms. These have glass transition temperatures approximately as follows:

Poly(dimethylsiloxane) $-123°$ C.
Poly(methylethylsiloxane) $-135°$ C.
Poly(methylpropylsiloxane) $-120°$ C.
Poly(methylhexylsiloxane) $-108°$ C.
Poly(methyloctylsiloxane) $-92°$ C.

Amongst these, particularly preferred are poly(dimethylsiloxane), that is, silicone rubber, and poly(methyloctyl)siloxane. Poly(methylphenylsiloxane) may also be used. Other rubbers that are expected to be useful include those listed in Table 1, specifically poly(dimethylsiloxane-dimethylstyrene) poly(siloctylene-siloxane) and poly(p-silphenylene-siloxane). Yet other rubbers include polymethylene, poly(dimethylsilylylenemethylene), cis-poly(1-butylene), poly(dimethoxyphosphazene), poly(octadecylmethacrylate) and poly(oxytetramethylenedithiotetramethylene), all of which have glass transition temperatures in the range $-70°$ C. to $-110°$ C. Yet other rubbers that may be useful include methylene-ethylene copolymers having glass transition temperatures around $-100°$ C., polyisoprene, polybutadiene and natural rubber.

Usually, rubbery materials do not have enough mechanical strength to be formed as unsupported membranes. Therefore, preferred embodiments incorporating rubbery selective materials involve the use of a composite membrane comprising a microporous support, onto which the rubbery selective layer is deposited as a thin coating. The preparation of such membranes is well known in the membrane-making art. It is commonly thought that rubbery composite membranes do not withstand high-pressure operation well, and to date, such membranes have not been generally used in natural gas treatment, where feed gas pressures are often as high as 500 psig or 1,000 psig. It has been found, however, that composite membranes, with thin enough rubbery selective layers to provide a transmembrane methane flux of at least $1 \times 10^{-6}$ cm$^3$(STP)/cm$^2$.s.cmHg, can be used satisfactorily at high feed pressures and not only maintain their integrity but continue to exhibit adequate selectivity for methane over nitrogen.

A second type of membrane that has been found to be useful for the process of the invention is formed from the so-called "super-glassy" polymers. These materials are characterized by having a rigid structure, high glass transition temperatures, typically above 100° C., 200° C. or higher, and unusually high free volume within the polymer material, such as more than 10%, more than 20% or even as high as 25% or more (as estimated from vapor solubility data according to the method of W. J. Koros et al., J. Membrane Science, Vol. 2, page 165, 1977). In contrast, conventional glassy polymers typically have free volumes within the polymer itself of a few percent, such as 3% for polycarbonate, or 6% for polyphenylene oxide. Super-glassy materials useful for carrying out the invention exhibit unusual behavior for glassy materials in that they preferentially permeate larger, more condensable molecules over smaller, less condensable molecules, so that they are selective, albeit slightly at room temperature, for methane over nitrogen. Super-glassy materials useful for carrying out the invention are further characterized in that they have a high methane permeability at room temperature, by which is meant a permeability of at least about 1,000 Barrer.

Without wishing to be bound by theory, it is believed that certain of the high-free-volume, glassy polymers are useful in the invention because their permeation properties are not governed by solution/diffusion (the mechanism of gas transport in conventional, low-free-volume polymers), but are more akin to transport in microporous polymers.

If numerical values for free volume, glass transition temperature and/or methane permeability are not to hand, therefore, a simple, first-pass screening technique to identify likely high-free-volume glassy polymers for carrying out the invention is to examine the oxygen/nitrogen permeability data. Such data are much more readily available for many materials than methane permeability data, and will enable potential candidate materials to be rapidly identified. It is believed that materials with the required structure to meet the demands of the invention will normally have oxygen permeabilities at room temperature of at least about 500 Barrer (where 1 Barrer=$1 \times 10^{-10}$ cm$^3$(STP).cm/cm$^2$.s.cmHg), and oxygen/nitrogen selectivity at room temperature of no more than about 2.5.

The best known of the super-glassy materials, representative of the class and useful in the invention, is polytrimethylsilylpropyne (PTMSP), which has a free volume of about 25% according to the above-mentioned method. Although PTMSP is rigid and glassy, up to at least about 200° C., it exhibits an oxygen permeability of 10,000 Barrer or above, more than 15 times higher than that of silicone rubber, previously the most permeable polymer known. The selectivity for oxygen/nitrogen, however, is low (1.5–1.8). The high permeability appears to be associated with an unusually high free-volume within the polymer material, and has been confirmed with many examples of pure gases and vapors, including oxygen, nitrogen, hydrogen, helium, methane, ethane, propane, butane and higher hydrocarbons, sulfur hexafluoride and carbon dioxide. These pure-gas data suggest that PTMSP will exhibit poor selectivity for most gas separations. See for example, a paper by N. A. Platé et al. entitled "Gas and vapor permeation and sorption in poly(trimethylsilylpropyne)", Journal of Membrane Science, Vol. 60, pages 13–24, 1991.

In work at Membrane Technology and Research, it was also found that permeation tests performed with pure gas samples of methane and nitrogen yielded low calculated ideal selectivities. We found, however, that the measured mixed-gas selectivity is slightly better, at about 2.5–3. Furthermore, we found that chilling the feed gas stream produced a substantial increase in selectivity, while maintaining good permeability. For example, chilling to −30° C. raised the mixed gas methane/nitrogen selectivity to about 5.5. This selectivity was obtained with a simulated natural gas stream containing 82% methane, 9% ethane, 3% propane, 1% butane and 5% nitrogen. As is discussed in more detail in co-owned and copending serial number (not yet assigned), entitled "Separation of Low-Boiling-Point Gases using Super-Glassy Membranes", incorporated herein by reference in its entirety, we discovered unexpectedly that the presence of the heavier and more condensable $C_{3+}$ hydrocarbons actually increases the selectivity between less condensable or non-condensable components such as methane and nitrogen.

Non-limiting examples of the types of polymer materials useful for carrying out the processes of the invention include members of the following structure groups that also meet the above glass-transition temperature, free volume and permeation limits:

(i) Substituted acetylenes, having the general structural formula

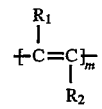

where $R_1$ and $R_2$ are independently hydrogen, a halogen, $C_6H_5$ or a linear or branched $C_1$–$C_4$ alkyl group.

(ii) Silicon-containing polyacetylenes, having the general structural formula

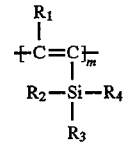

where $R_1$ is a linear or branched $C_1$–$C_4$ alkyl group, $R_2$ and $R_3$ are independently linear or branched $C_1$–$C_6$ alkyl groups, and $R_4$ is a linear or branched $C_1$–$C_{12}$ alkyl or aryl group.

(iii) Germanium-containing polyacetylenes, having the general structural formula

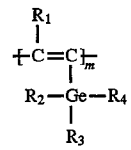

where $R_1$ is a linear or branched $C_1$–$C_4$ alkyl group, $R_2$ and $R_3$ are independently linear or branched $C_1$–$C_6$ alkyl groups, and $R_4$ is a linear or branched $C_1$–$C_{12}$ alkyl or aryl group.

(iv) Copolymers of any of the above with each other or with other polymer materials.

A particularly useful polymer material falling within the general definitions above is poly(trimethylsilylpropyne) (PTMSP), which has the structure:

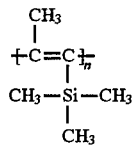

Membranes useful in the process of the invention may be formed from these glassy, high-free-volume materials in a variety of ways. Because the materials are glassy and rigid, an unsupported film of the polymer may be usable as a single-layer gas separation membrane. Alternatively, the membrane may be an integral asymmetric membrane, comprising a dense region that forms the separation membrane and a microporous support region. As a further alternative, the membrane may be a composite membrane comprising the separation membrane and an attached or unattached backing layer, or a composite membrane comprising a microporous support membrane of one polymer coated with the separation membrane of another polymer. I prefer to use composite membranes.

Whether rubbery or super-glassy membrane materials are used, membranes useful in the invention may be formed as flat sheets, hollow fibers or any other convenient form, and housed in any appropriate type of module, such as plate-and-frame, potted fiber or spiral-wound. Spiral-wound modules are a preferred choice.

The process of the invention is represented in simple form in the schematic drawing of FIG. 1. Referring now to this figure, membrane unit 1 contains a membrane 2 that exhibits a methane/nitrogen mixed gas selectivity in the presence of at least one other component of about 4, more preferably about 5 or more. Feed stream 3, containing methane, nitrogen and at least one other component, passes across the feed side of the membrane. Transmembrane permeation occurs because the permeate side of the membrane is at a lower pressure than the feed side. Residue stream 4, enriched in nitrogen and depleted in methane and the other component compared with stream 3, is withdrawn from the feed side. Permeate stream 5, enriched in methane and the other component and depleted in nitrogen compared with stream 3, is withdrawn from the permeate side of membrane 2. Residue stream 4 passes to cryogenic distillation unit 6 for further separation of nitrogen from methane. Bottom stream 8 from the distillation unit is the methane stream. Overhead stream 7 is the nitrogen stream, which may simply be a reject stream to be discarded, or may itself be a useful product, or the principal product, of the separation.

The driving force for transmembrane permeation may be provided, for example, by compressing the feed stream, drawing a vacuum on the permeate side, or a combination of both. Such means may not be needed if the incoming gas stream is already at high pressure, as will be the case with many natural gas streams, among others.

Figure 2:
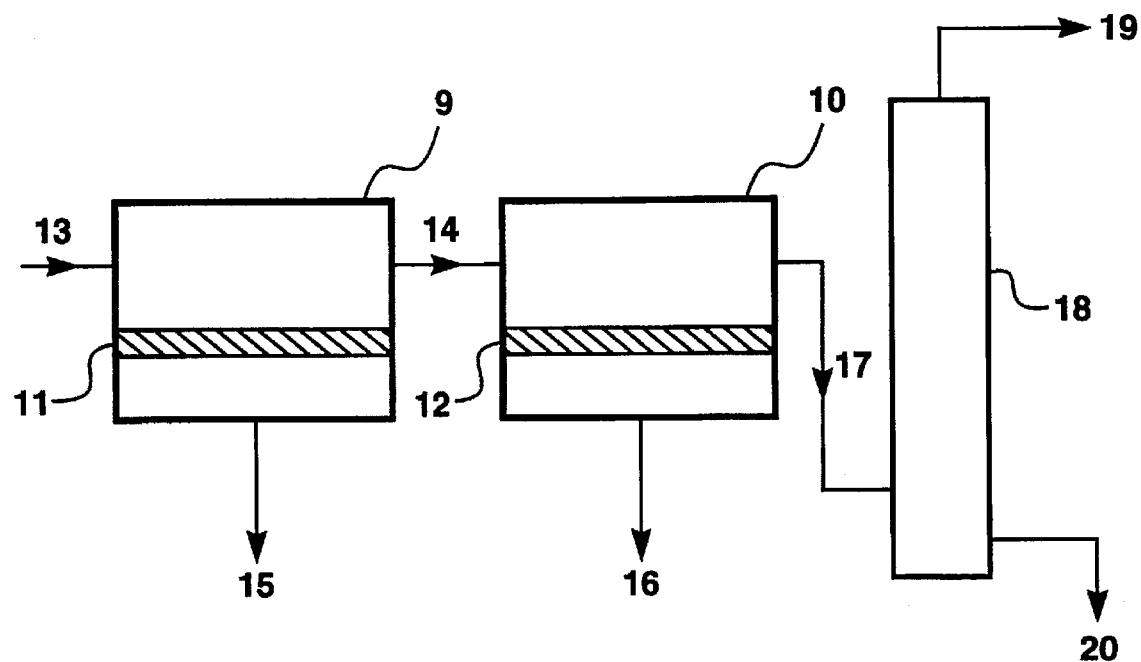
FIG. 2 is a schematic drawing illustrating the process of the invention as carried out using a two-step membrane unit.

FIG. 1 shows the membrane separation step as a simple one-stage operation. It will be apparent to those of skill in the art that the membrane separation step can also be carried out in multiple stages or steps. As one example, if the feed stream contains large amounts of contaminants, or multiple contaminants, such that the presence of one contaminant interferes with the removal of another, it is possible to divide the membrane separation step into two sub-steps, as shown in FIG. 2. Referring now to this figure, membrane units 9 and 10 contain membranes 11 and 12, which may be the same or different, but are both selective for methane and at least one contaminant of the stream over nitrogen. Gas stream 13, containing methane, nitrogen and at least one other component passes across the first membrane bank to produce residue stream 14 and permeate stream 15. Residue stream 14 then passes across the feed side of the second membrane bank to produce a second residue stream 17, and a second permeate stream, 16. Stream 17, depleted in methane and contaminants and enriched in nitrogen is separated into nitrogen overhead stream 19 and methane bottom stream 20 by the cryogenic separation unit 18. In such a design, the compositions and further destinations of streams 15 and 16 are likely to be different. As just one example, the first membrane may be chosen to remove water vapor to a high degree, but be less effective for carbon dioxide removal. The second membrane may be used predominantly for carbon dioxide removal, but also serve as a polishing step for water vapor removal. Optionally, the second permeate stream, 16, may be recirculated and mixed with incoming feed stream 13. As a second example, the first membrane may be chosen for its acid-gas removal properties, so that streams 14 and 16 do not contain significant amounts of acid gas. This may reduce the cost of further acid-gas treatment downstream, by concentrating the acid gases in a stream of comparatively small volume.

For embodiments such as that of FIG. 2, the process of the invention comprises:

(a) providing a membrane having a feed side and a permeate side and being selective for both methane and one other component over nitrogen;

(b) passing the gas stream to be treated across the feed side of the membrane at a temperature at which the membrane exhibits the target selectivity for methane over nitrogen;

(c) withdrawing from the feed side a first residue stream depleted in both methane and the other component and enriched in nitrogen compared with the raw gas stream;

(d) withdrawing from the permeate side a first permeate stream enriched in both methane and the other component and depleted in nitrogen compared with the raw gas stream;

(e) providing a second membrane having a second feed side and a second permeate side and being selective for methane and one other component over nitrogen;

(f) passing the first residue stream across the second feed side of the second membrane;

(g) withdrawing from the second feed side a second residue stream depleted in both methane and the other component and enriched in nitrogen compared with the first residue stream;

(h) withdrawing from the second permeate side a second permeate stream enriched in both methane and the other component and depleted in nitrogen compared with the first residue stream;

(i) subjecting the second residue stream to a cryogenic separation step.

Figure 3:
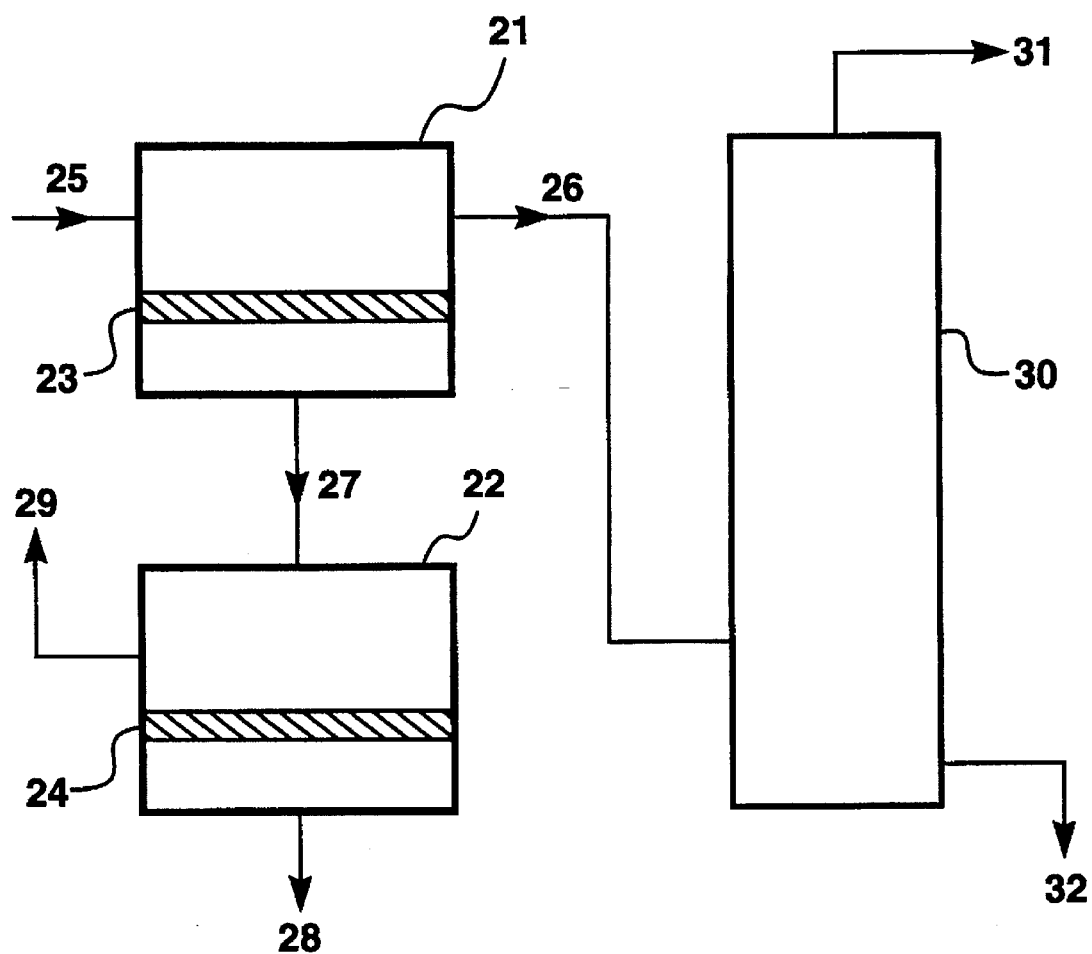
FIG. 3 is a schematic drawing illustrating the process of the invention as carried out using a two-stage membrane unit.

An example of a two-stage system is shown in FIG. 3. Referring now to this figure, membrane units 21 and 22 contain membranes 23 and 24, which may be the same or different, but are both selective for methane and at least one contaminant of the stream over nitrogen. Gas stream 25, containing methane, nitrogen and at least one other component passes across the first membrane bank to produce residue stream 26 and permeate stream 27. Residue stream 26 then passes to the cryogenic separation unit, 30, where it is separated into overhead stream, 31 and bottom stream, 32. Permeate stream 27 passes across the feed side of the second membrane bank to produce a second residue stream 29, and a second permeate stream, 28. Optionally, second residue stream 29 may be recirculated and mixed with incoming feed stream 25.

Embodiments such as this are useful when greater concentration of methane and/or contaminants than can be achieved by the first membrane stage is desired. For embodiments such as that of FIG. 3, the process of the invention comprises:

(a) providing a membrane having a feed side and a permeate side and being selective for both methane and one other component over nitrogen;

(b) passing the gas stream to be treated across the feed side of the membrane at a temperature at which the membrane exhibits the target selectivity for methane over nitrogen;

(c) withdrawing from the feed side a first residue stream depleted in both methane and the other component and enriched in nitrogen compared with the raw gas stream;

(d) withdrawing from the permeate side a first permeate stream enriched in methane and the other component and depleted in nitrogen compared with the raw gas stream;

(e) providing a second membrane having a second feed side and a second permeate side and being selective for both methane and one other component over nitrogen;

(f) passing the first permeate stream across the second feed side of the second membrane;

(g) withdrawing from the second feed side a second residue stream depleted in methane and the other component and enriched in nitrogen compared with the first permeate stream;

(h) withdrawing from the second permeate side a second permeate stream enriched in methane and the other component and depleted in nitrogen compared with the first permeate stream;

(i) subjecting the first residue stream to a cryogenic separation step.

Cryogenic distillation is well known and requires no lengthy explanation. The cryogenic separation step can be carried out by any method known in the art, the specifics of which will vary from case to case, depending on the composition and volume of the gas entering the step, the compression and refrigeration equipment available, and other factors.

Broadly, cryogenic distillation units have two sections: (i) a refrigeration section to take the mixture to be distilled down to a low-temperature, high-pressure gas, gas/liquid mixture or liquid; and (ii) a distillation column. Refrigeration is generally accomplished by a series of compression and cooling steps. These usually, but not necessarily, include cooling by heat-exchange with product streams, plus further cooling against an external refrigerant. Distillation is typically, but again not necessarily, carried out in a column containing trays or packed beds and having an upper rectification section, in which ascending vapor mixes with descending condensed liquid, and a lower stripping section.

Two designs of distillation column, single-column and two-column, are prevalent. Both are suitable for use in the invention and are adaptable to a range of nitrogen feed concentrations. The single-column design operates at high pressure and produces a pressurized, nearly pure nitrogen product at the top of the column. Methane is recovered as a liquid bottoms product. Circulation of the liquid methane can provide the necessary refluxing to effect the separation. Pure methane can be obtained as a low-pressure gaseous product that usually has to be recompressed for sale.

In a two-column design, a high-pressure column is used to perform a partial separation, resulting in a nearly pure nitrogen top product and a mixed nitrogen/methane liquid bottoms product. This mixed product is flashed in a low-pressure column to produce two essentially pure streams of nitrogen and methane. The refluxing for the low-pressure column is provided by the nitrogen produced in the high-pressure column. The vent nitrogen produced in the two-column design is essentially at atmospheric pressure.

Occasionally, the gas stream to be treated by membrane separation may already be at a temperature at which the desired selectivity is manifest, but in most cases the stream will need to be chilled. It is obviously desirable to practice heat integration as far as possible, both in providing the refrigeration for the distillation and the cooling for the membrane separation. As just one example, referring again to FIG. 1, nitrogen-rich stream 7 from the distillation unit is both cold and at high pressure. Furthermore, this stream is often a waste stream or is acceptable for further use at lower pressure. A simple, convenient method to provide heat integration is to expand this stream through a turbo-expander, thereby reducing its temperature even further. The resulting lower-pressure, colder nitrogen, or a portion thereof, can be run in heat-exchanging relationship against stream 4 en route to the cryogenic unit. The cold nitrogen stream, or a portion thereof, may also be used to cool incoming feed stream 3. The bottom methane-rich stream, 8, may also be available for cooling other streams, particularly if it does not need to be maintained at high pressure. Many other heat integration opportunities are present within the scope of the invention and will be apparent to those of skill in the art.

As was mentioned above, the membrane separation step is designed to remove contaminants that might otherwise become solid and plug the downstream refrigeration units or distillation column. Such a component typically, but not necessarily, has a melting point above $-150°$ C. at 1 atmosphere pressure. Compounds that fall into this category and that are within the scope of the invention include, but are not limited to, many hydrocarbons, such as straight-chain or branched-chain saturated or unsaturated hydrocarbons; aromatic hydrocarbons, such as benzene, xylene, ethylbenzene and toluene; acid gases, such as carbon dioxide and hydrogen sulfide; and water. Therefore, at least one such component should pass preferentially through the membrane with the methane. Water is an example that occurs in many or most raw gas streams, whether natural gas or gas from some other source. Drying of the gas stream upstream of the cryogenic unit in the prior art is usually carried out by condensation, adsorption, absorption or sometimes combinations of these. The membranes preferred for use in the invention are all highly permeable to water vapor, with transmembrane fluxes of at least about $1 \times 10^{-5}$ cm$^3$(STP)/cm$^2$.s.cmHg. Thus, it will frequently be possible to remove 99+ % of the water in the incoming feed just by the membrane separation step, even if the relative humidity of the incoming stream is high. In many cases, this means that no additional water removal step need be employed. In other cases, the lifetime of the materials used in that additional step, such as desiccants, sieves, or glycol solutions, may be substantially extended, and/or the size of the additional unit may be substantially reduced compared with prior systems.

Another example of a component that may plug the cryogenic unit is carbon dioxide. If the gas to be treated is natural gas, landfill gas, gas from EOR operations, or gas from petrochemical processing, it is likely to contain carbon dioxide, sometimes in large amounts, such as up to 10% or more. In conventional natural gas processing, carbon dioxide is usually removed by scrubbing with an amine solution, which is later regenerated, or sometimes by separation through cellulose acetate or similar membranes. The membranes of the invention are selective for carbon dioxide with typical carbon dioxide/nitrogen selectivity of 5, 10, 15 or more. Thus, again it is possible, assuming modest to moderate carbon dioxide content in the feed gas, for the membrane step to remove carbon dioxide to a sufficiently low level that no additional carbon dioxide removal step need be used. If the gas is more heavily contaminated with carbon dioxide, the separation achieved by the membrane may be supplemented as necessary by other removal technology or by other types of membrane separation. As in the water vapor example, savings in unit capacity of that technology and extended operating lifetime are possible.

Other exemplary components that may be present in the feed gas stream are the $C_{3+}$ hydrocarbons, such as propane, butane, pentane and so on. The membranes used in the invention are more permeable to propane and heavier hydrocarbons than to nitrogen. They are also more permeable to these components than to methane. Thus, any of these hydrocarbons present in the feed will be concentrated in the permeate stream. Yet again, selectivities and fluxes, especially of the super-glassy membrane materials, are sufficiently high that essentially complete removal from the residue stream is often possible.

One particular advantage of the present invention is the ability of the membranes to operate in the presence of saturation concentrations of water and many hydrocarbons, where necessary. Water is always present in raw natural gas streams to some extent, as vapor, entrained liquid, or both. The presence of this water has little or no adverse effects on the types of membranes used in the invention, but will simply permeate the membrane along with the methane. Likewise, propane, butane and higher hydrocarbons will pass into the permeate stream. Even if the membrane separation is performed at close to the dew point for these components, any condensation of liquid will not damage the membrane. In fact, as discussed in more detail in co-owned and copending serial number (not yet assigned), entitled "Separation of Low-Boiling-Point Gases using Super-Glassy Membranes", incorporated herein by reference in its entirety, when super-glassy membranes are used, the presence of material in the feed stream that can condense within the membrane enhances the methane/nitrogen separation capability.

In optimum situations, where contaminants such as those mentioned above are present in modest amounts, such as below 1,000 ppm for water vapor, below 5% for carbon dioxide and below 5% for $C_{3+}$ hydrocarbons, the membrane unit can usually be sized and operated to meet specifications for cryogenic separation, even if multiple contaminants are present.

In intermediate situations, the process of the invention may meet specification for one or more contaminants, but to remove others may need supplementary treatment, such as a scrubber to capture excess carbon dioxide, or a molecular sieve to remove the last traces of water vapor.

In the worst case, where the gas stream is heavily contaminated, such as with more than 10% each of carbon dioxide and $C_{3+}$ hydrocarbons, and saturated with water vapor, supplementary separation units for each separate contaminant might be necessary.

The processes outlined in FIGS. 1–3 have further advantages over conventional cryogenic processes. In addition to removing contaminants, the membrane system performs a partial separation of methane from nitrogen. This reduces the flow of gas to the cryogenic plant, and hence the needed cryogenic capacity. Thus, even in the worst case scenario described above, the process will find useful and advantageous application, as will now be explained from another aspect.

In carrying out the process of the invention, the stage-cut at which the membrane unit is operated is important. Stage-cut is defined as the percentage ratio of total permeate flow to total feed flow, and is hence a measure of the proportion of the feed that passes through the membrane. Obviously, the higher the stage-cut, the more of all feed components will have passed through the membrane to the permeate side. In the processes of the invention, the stage-cut will typically be determined by the acceptable nitrogen content in the permeate gas. In many cases, there will likely be an upper limit on this value, such as no more than 8% nitrogen, or no more than 4% nitrogen. If this gas is to be passed to a natural gas pipeline and contains other inerts, the upper limit may be lower, such as 2%. This limit determines an upper limit on the stage-cut, the numerical value of which will vary depending on the nitrogen content of the feed and the separation capabilities of the membrane.

On the other hand, one of the objectives of the membrane separation step is to reduce the freezable contaminant content of the feed to a very low level. The higher the stage-cut, the more of these freezable contaminants will be removed into the permeate stream. A high stage-cut also has the benefit of reducing the volume of gas to be processed in the cryogenic step. For example, if the stage-cut is 50%, this means that, referring to FIG. 1 for example, half of the feed to the process emerges as permeate stream 5, and half goes to the cryogenic unit as stream 4. Thus a stage-cut of 50% means the burden on the cryogenic unit is reduced by 50%. Likewise, if the stage cut is 60%, the burden on the cryogenic unit is reduced by 60%.

In general, this reduction in load is advantageous, because it saves on both capital and operating costs of the cryogenic step. If the load supplied to the cryogenic unit is reduced to, say, one third of its value absent the membrane unit, then the same cryogenic plant can now process three times the quantity of raw gas than was previously possible. Because many uses of the permeate gas require it to be repressurized, the cost of repressurizing the gas has to be taken into account in the cost and energy balance of the system. However, the cost of operating the membrane unit plus the permeate recompression cost is normally substantially less, per unit of gas treated, than the conventional pretreatment costs for the cryogenic plant plus the cost of operating the plant itself.

Thus, those of skill in the art will appreciate that the optimum stage-cut must be determined from a balance of the factors discussed above on a case-by-case basis. As a guideline, I most prefer to operate the process at, or close to, the highest possible stage-cut permitted by the limit on the nitrogen content of the permeate. In numerical terms, the preferred stage-cut is at least 30%, more preferably at least 40% and most preferably at least 50%.

Those of skill in the art will appreciate from the discussion above that the invention can be useful in some of its aspects, even when only two components, methane and nitrogen, are present. In this case, the membrane separation step serves principally to reduce the load on the cryogenic separation step, and/or as a means for enabling a portion of the gas stream to bypass the cryogenic separation step. Thus, as explained above, the invention enables a cryogenic unit of a certain capacity to handle a much larger feed stream than would be possible absent the membrane step. For example, the load to the cryogenic unit may be reduced to 80%, 60%, 50%, 40%, 30% or even 20% of the corresponding load for a stand-alone cryogenic unit. Thus, a unit of the same capacity is now able to process 1.3, 1.7, 2, 2.5, 3.3 or even 5 times as much flow of gas than otherwise. The higher the possible stage-cut of the membrane step, the greater will be the reduction in load on the cryogenic step.

In this embodiment, the invention then comprises:
(a) providing a membrane having a feed side and a permeate side and being selective for methane over nitrogen;
(b) passing said gas stream across the feed side of said membrane at a temperature at which the membrane exhibits a selectivity for methane over nitrogen of at least about 5;
(c) withdrawing from said feed side a residue stream depleted in methane and enriched in nitrogen compared with said gas stream;
(d) withdrawing from said permeate side a permeate stream enriched in methane and depleted in nitrogen compared with said gas stream;
(e) subjecting said residue stream to cryogenic separation of nitrogen from methane.

The process in this aspect may be used for production of any of liquid methane, gaseous methane and nitrogen, as end products themselves or as fuels or feedstocks to other processes.

Yet another advantageous aspect of the invention, particularly as it relates to natural gas processing, is as follows. One of the drawbacks of cryogenic separation is that the specifications for the gas entering the cryogenic unit are much more demanding than typical pipeline specifications. Natural gas pipeline specification for carbon dioxide is usually in the range 1–3%, for water vapor up to about 140 ppm, and for propane and the heavier hydrocarbons a dewpoint of $-20°$ C. On the other hand, for the gas to be suitable for cryogenic processing, the carbon dioxide content should typically be no more than about 100 ppm, the water vapor content no more than about 1–2 ppm, and the hydrocarbon dewpoint below at least $-100°$ C. This disparity creates a disincentive to use cryogenic techniques for methane/nitrogen separation in natural gas processing. The "overprocessing" needed to meet the cryogenic requirements can be costly, inconvenient and can lead to the creation of secondary streams and wastes for which there is no ready use or disposal method.

The process of the invention can be used to overcome this problem in a simple way. Suppose that, besides methane, the raw gas contains 10% nitrogen, 1% carbon dioxide, 100 ppm water vapor and has a $C_{3+}$ hydrocarbon dewpoint of $-50°$ C. Thus, apart from an excess of nitrogen (>4%), the raw gas meets pipeline specification. The membrane step enables the pipeline-acceptable levels of carbon dioxide, water vapor and hydrocarbons, plus a portion of methane and nitrogen, to bypass the cryogenic unit. The membrane permeate stream, containing these components, can be remixed with the essentially pure methane bottom stream from the cryogenic unit to yield a pipeline quality methane product stream. Since the membrane permeate is to be remixed with a volume of pure methane, the nitrogen content in the permeate stream can be higher than pipeline target, so long as the remixed methane product gas does not exceed the total inerts, carbon dioxide or nitrogen requirements of the pipeline. Even if the starting composition of the gas and the operating constraints are such as to yield a remixed stream that exceeds specification, the option exists to carry out the process as described above, then dilute the methane product stream further with clean gas or subject it to some supplementary treatment.

For example, referring to the basic design of FIG. 1, the methane product stream would be produced by remixing the two methane-laden streams, permeate stream 5 and methane-rich stream 8, downstream of unit 6. In processes of this type, no methane is lost during the process and the only stream produced besides the pipeline gas is the clean nitrogen stream from the top of the cryogenic distillation column. In the design of FIG. 2, streams 15 or 16 or both can be remixed with stream 20. In the design of FIG. 3, stream 28 may be remixed with stream 32. It will be apparent to those of skill in the art that the gas composition numbers given in the paragraph above are merely representative, and that many raw gas compositions exist that will be able to take advantage of the invention in this aspect. Also, gas streams that have been subjected to some pretreatment, such as partial dehydration, or knocking out of excess heavy hydrocarbons, will be amenable to treatment according to this aspect of the invention.

Of course, other destinations for streams 5, 8, 15, 16, 20, 28 and 32, either mixed or unmixed, are possible within the scope of the invention. Methane streams 8, 20 and 32 may be withdrawn from the process and used as a liquid or gas product with or without further treatment, sent without mixing to a gas pipeline, or otherwise used, treated or disposed of as required. Likewise, streams 5, 15, 16 and 28 may be sent to a pipeline, used as fuel, or otherwise used, further treated or disposed of.

The process of the invention is useful for treating any gas stream that contains methane and nitrogen in admixture with one or more other potentially freezable gases or vapors. If the stream is natural gas, methane is usually, but not necessarily, the major component of the stream. Other representative streams that contain methane and nitrogen include streams from carbon dioxide miscible flooding of oil reservoirs for enhanced oil recovery (EOR), streams from nitrogen pressurization of underground oil/gas formations, landfill gas or biogas, and gas streams from petrochemical and other chemical processing. Depending on the source of the gas, other constituents besides methane and nitrogen may include other hydrocarbons, carbon dioxide, water vapor and hydrogen sulfide, for example.

Any known treatments may be used as desired upstream or downstream of the process of the invention, or between the membrane and cryogenic distillation steps, to supplement the separation achieved or to remove other components. In other words, using the basic design of FIG. 1 yet again as an example, any of streams 3, 4, 5, 7 or 8 can be subjected to supplementary separation or treatment steps as desired. Such treatments include, but are not limited to, other membrane separations, condensation, absorption or adsorption. For example, if the gas stream to be treated is natural gas containing $C_{3+}$ hydrocarbons, meaning propane and heavier hydrocarbons, it may be possible, and is desirable, to utilize the cooling provided to the feed stream of the membrane step to recover a natural gas liquids (NGL) stream as an additional product. This can be done if the temperature required to achieve adequate methane/nitrogen selectivity and the hydrocarbon dewpoint of the raw feed gas are of the same order. Combinations of membrane separation and condensation that might be used to recover the heavier hydrocarbons as a liquid product are shown, for example, in U.S. Pat. Nos. 5,089,033; 5,199,962; 5,205,843; and 5,374,300.

Many further ways to make use of the process of the invention as a stand-alone operation or to incorporate it into other separation and treatment schemes will suggest themselves to those of skill in the art based upon the teachings given herein. Without limiting the scope of the invention in any way, I believe that the process of the invention will be most useful in treating streams having a relatively high nitrogen content, such as at least about 10% nitrogen, at least about 20% nitrogen or even more. I also believe the invention will be particularly advantageous in treating relatively large streams, such as those having flow rates about 20 MMscfd.

In another aspect, the invention is a novel apparatus combination for carrying out processes for separating gas mixtures that contain at least nitrogen, methane and another component. In its most basic form, the apparatus of the invention comprises a membrane separation unit followed by a cryogenic separation unit. The cryogenic separation unit is adapted to separate nitrogen from methane. In other words, it operates under temperature, pressure and other conditions sufficient to create a liquid methane bottom product and a gaseous nitrogen overhead product. The membrane separation unit is positioned upstream of the cryogenic separation unit. By upstream, I mean that a gas stream for treatment passes through the membrane separation unit, then through the cryogenic separation unit. Specifically, the two units are arranged as generally shown in the process schematic of FIG. 1, with the residue line from the membrane separation unit being connected, directly or indirectly, with the inlet to the cryogenic separation unit. Normally this means that the residue stream will pass out of the membrane unit and into the cooling/refrigeration portion of the cryogenic separation unit.

The membrane separation unit is characterized in that it contains a membrane that exhibits a combination of a chosen target selectivity for methane over nitrogen, and a transmembrane methane pressure-normalized flux of at a very minimum at least about $1 \times 10^{-6}$ cm$^3$(STP)/cm$^2$.s.cmHg, preferably at least $1 \times 10^{-5}$ cm$^3$(STP)/cm$^2$.s.cmHg and more preferably at least $1 \times 10^{-4}$ cm$^3$(STP)/cm$^2$.s.cmHg. The target selectivity will be at least about 4, more preferably at least about 5, yet more preferably at least about 5.5 and most preferably at least about 6. This combination of properties must be achievable at an operating temperature no lower than about $-70°$ C., more preferably no lower than about $-60°$ C. and most preferably no lower than about $-50°$ C. Thus, the membrane is limited by these functional constraints to the types of membranes discussed earlier, namely specific rubbers with low glass transition temperatures and super-glassy materials.

Optionally, the apparatus may also include one or more additional gas-treating means. These means may be positioned upstream of the membrane separation unit, that is, connected directly or indirectly to the feed line to the membrane unit, so that gas is first treated by the additional means, then by the membrane separation unit. Alternatively, or as well, such means may be connected directly or indirectly to the permeate line from the membrane separation unit, so that the permeate gas can be subjected to additional treatment. As a third alternative, or in conjunction with either of the options above, additional gas-treating means may be positioned between the membrane separation unit and the cryogenic separation unit, and connected directly or indirectly to the residue line from the membrane separation unit, so that residue gas is subjected to additional intermediate treatment before passing on to the cryogenic separation unit.

Any appropriate equipment can be used for these additional means, such as absorption units, including towers or columns containing liquid absorbents; adsorption units, including molecular sieves; condensation units, relying on chilling, compression or both to liquefy a portion of the gas stream; and membrane units, including those containing membranes selectively permeable to carbon dioxide or other constituents of the gas.

The invention is now further illustrated by the following examples, which are intended to be illustrative of the best mode of carrying out the invention, but are not intended to limit the scope or underlying principles of the invention in any way.

EXAMPLES

Example 1

A calculation was performed to determine the membrane selectivity required to separate a gas containing 10% nitrogen and 90% methane into two streams, one containing no more than 4% nitrogen, suitable for delivery to a natural gas pipeline, and the other containing 50% nitrogen, suitable for use as on-site fuel. The separation was assumed to be performed with a nitrogen-selective membrane. The separation was also required to provide at least about 93% recovery of methane, which is an acceptable level of methane loss, at least in some situations. The calculation was performed using an in-house computer modeling program. The flow rate of the feed stream was assumed to be 5 MMscfd. The methane pressure-normalized flux of the membrane was assumed to be $1 \times 10^{-5}$ cm$^3$(STP)/cm$^2$.s.cmHg; the nitrogen flux was adjusted to provide increasing nitrogen/methane selectivity. The results from the modeling calculation are shown in Table 2.

TABLE 2

| Selectivity $N_2/CH_4$ | Methane recovery (%) | Permeate methane content (%) | Membrane area (m$^2$) |
|---|---|---|---|
| 5 | 77.3 | 74 | 704 |
| 10 | 90.7 | 60 | 347 |
| 15 | 92.5 | 51 | 232 |
| 17 | 93.3 | 48 | 206 |

As can be seen, a membrane selectivity of 17 is required to achieve the target separation.

Example 2

A calculation was performed to determine the membrane selectivity required to separate a gas containing 10% nitrogen and 90% methane into two streams, one containing no more than 4% nitrogen, suitable for delivery to a natural gas pipeline, and the other containing 50% nitrogen, suitable for use as on-site fuel. This time, the separation was assumed to be performed with a methane-selective membrane. The separation was again required to provide at least about 93% recovery of methane. The calculation was performed with the same in-house computer modeling program as in Example 1, assuming a flow rate of 5 MMscfd. This time, the nitrogen pressure-normalized flux of the membrane was assumed to be $8 \times 10^{-5}$ cm$^3$(STP)/cm$^2$.s.cmHg; the methane flux was adjusted to provide increasing nitrogen/methane selectivity. The results from the modeling calculation are shown in Table 3.

TABLE 3

| Selectivity CH$_4$/N$_2$ | Methane recovery (%) | Residue methane content | Membrane area (m$^2$) |
|---|---|---|---|
| 2.5 | — | — | — |
| 4 | 64.0 | 78 | 75 |
| 5 | 84.9 | 67 | 74 |
| 6 | 91.8 | 53 | 69 |
| 6.5 | 93.7 | 47 | 66 |

As can be seen, the target separation can be achieved in this case with a much lower membrane selectivity of just over 6. Also, the membrane areas required to perform the separation are much less.

Example 3

Preparation of Silicone Rubber Membrane

A microporous support membrane was dip-coated in a 6% dimethyl siloxane solution at 1 ft/min coating speed, then dried in an oven at 60° C. to crosslink the membrane. The resulting membranes had a nominal selective layer thickness of 20 μm. Samples of the finished composite membrane were cut into 12.6 cm$^2$ stamps and tested in a permeation test-cell apparatus with pure oxygen and pure nitrogen at 23° C. feed temperature and 50 psig feed pressure. The gas fluxes of the membranes were measured, and the oxygen/nitrogen selectivities were calculated. Any membrane with a selectivity less than the intrinsic selectivity of the material was considered defective.

Example 4

Preparation of Pebax 2533 Membrane

Membranes were prepared as in Example 3, using a 5% Pebax 2533 polymer solution. The resulting membranes had a nominal selective layer thickness of 6 μm. Fluxes and selectivities of the finished membranes were calculated to test for integrity as in Example 3.

Example 5

Preparation of PTMSP Membrane

Films of PTMSP were prepared by hand-casting. A 2-wt % polymer solution in toluene was cast onto clean glass plates with a casting bar. After evaporation of the solvent, the films were removed from the glass plate by immersion in water and were dried in a vacuum oven at 80° C. The nominal thickness of the films was about 30 μm. Fluxes and selectivities of the finished films were calculated to test for integrity as in Example 3.

Example 6

Effect of Feed Temperature on Silicone Rubber Membrane

Figure 5:
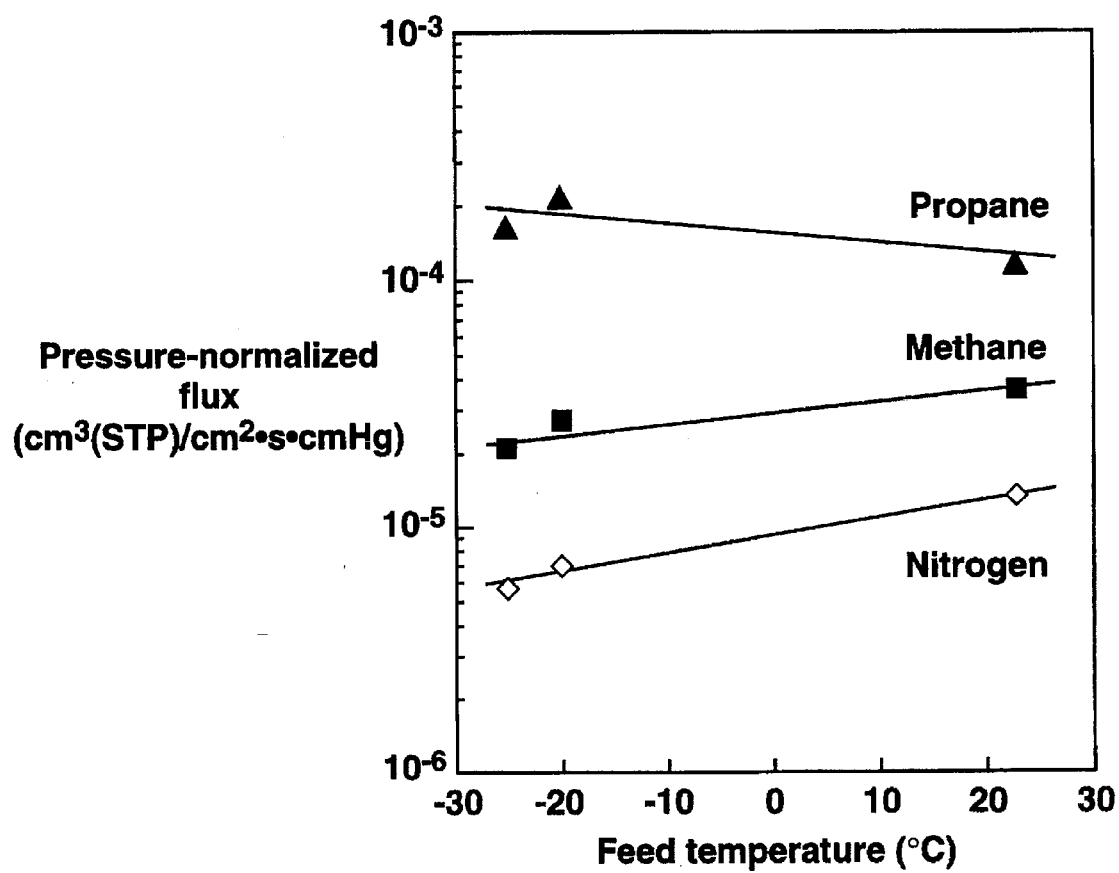
FIG. 5 is a graph of pressure-normalized flux as a function of feed temperature for permeation of propane, methane and nitrogen through a silicone rubber membrane.
Figure 6:
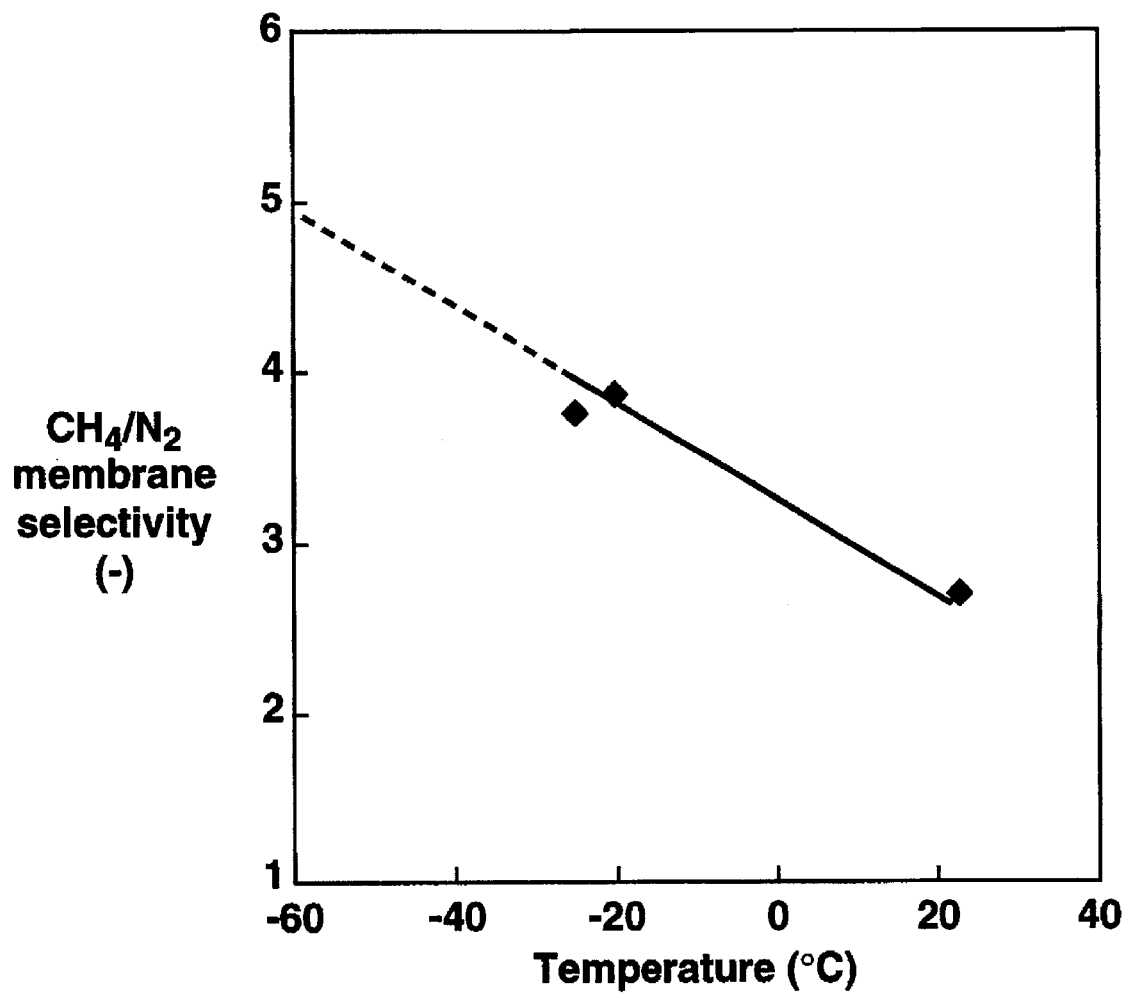
FIG. 6 is a graph of methane/nitrogen selectivity as a function of feed temperature for a silicone rubber membrane.

An experiment was carried out to determine the performance of a silicone rubber membrane at different temperatures. Membranes were prepared as in Example 3. The silicone rubber composite membrane was cut into 12.6-cm$^2$ stamps, and subjected to permeation tests following the general procedure as described in Example 3, using a model natural gas mixture containing 87% methane, 10% nitrogen, and 3% propane at three feed temperatures, −26° C., −10° C., and 23° C. The low temperatures were obtained by immersing the test cell in a low-temperature recirculating chiller. Measurements were made at a feed pressure of 200 psia. The permeate side was maintained at atmospheric pressure. During each test, the feed, permeate, and residue compositions were analyzed by gas chromatography (GC). The pressure-normalized fluxes of propane, methane, and nitrogen, and the propane/nitrogen, propane/methane, and methane/nitrogen selectivities were calculated using an in-house computer program. Flux and selectivity results are shown in FIGS. 5 and 6.

The pressure-normalized fluxes of nitrogen and methane both decrease with decreasing temperature, because of a decrease in diffusion coefficient that exceeds the gain in solubility coefficient. For propane, a condensable gas, the increase in solubility is larger than the decrease in diffusion coefficient, resulting in a net increase in the pressure-normalized flux at lower temperatures.

The methane/nitrogen selectivity increased with decreasing temperature, from about 2.7 at 23° C., to about 4 at sub-ambient temperatures. As can be seen from FIG. 6, a selectivity of about 5 could be obtained at an operating temperature of about −60° C. This temperature is sufficiently above the glass-transition temperature of silicone rubber (−123° C.) that the selectivity is still increasing as temperature falls.

Example 7

Effect of Temperature on Pebax Membrane

Figure 7:
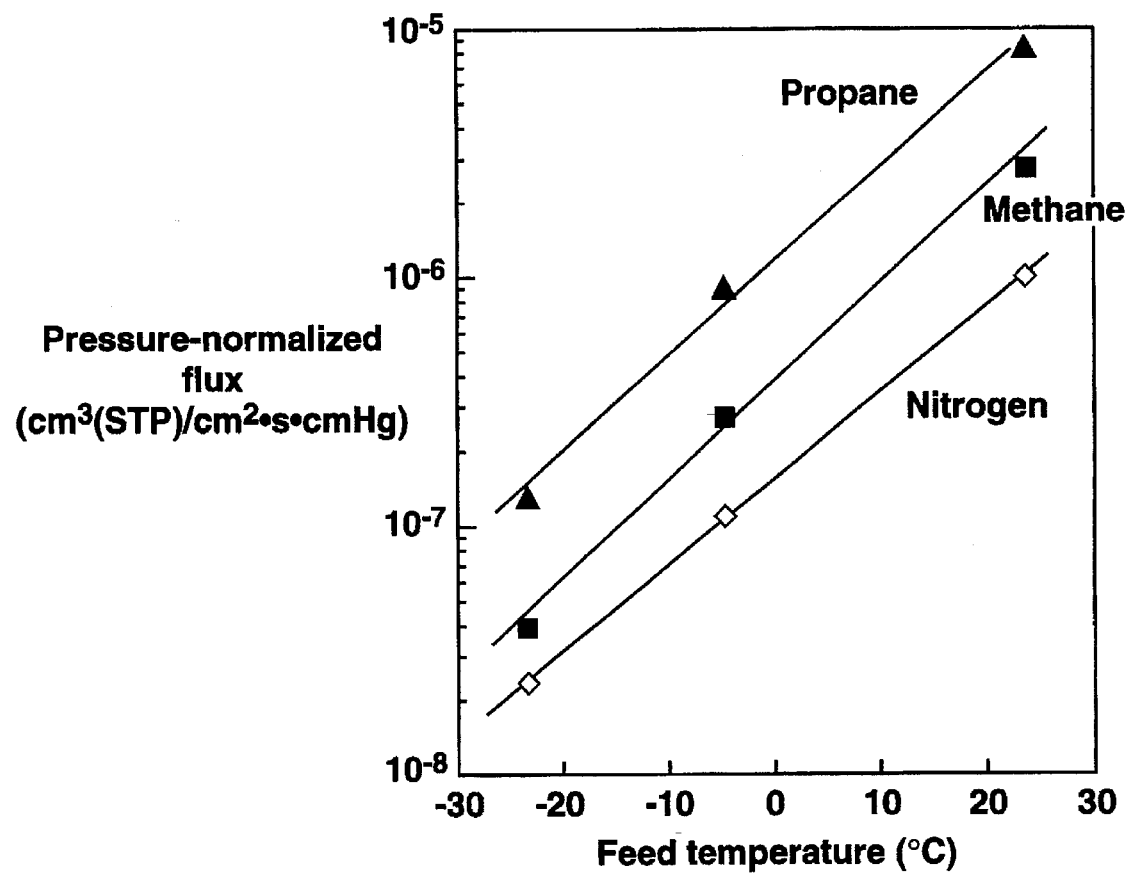
FIG. 7 is a graph of pressure-normalized flux as a function of feed temperature for permeation of propane, methane and nitrogen through a Pebax 2533 membrane.
Figure 8:
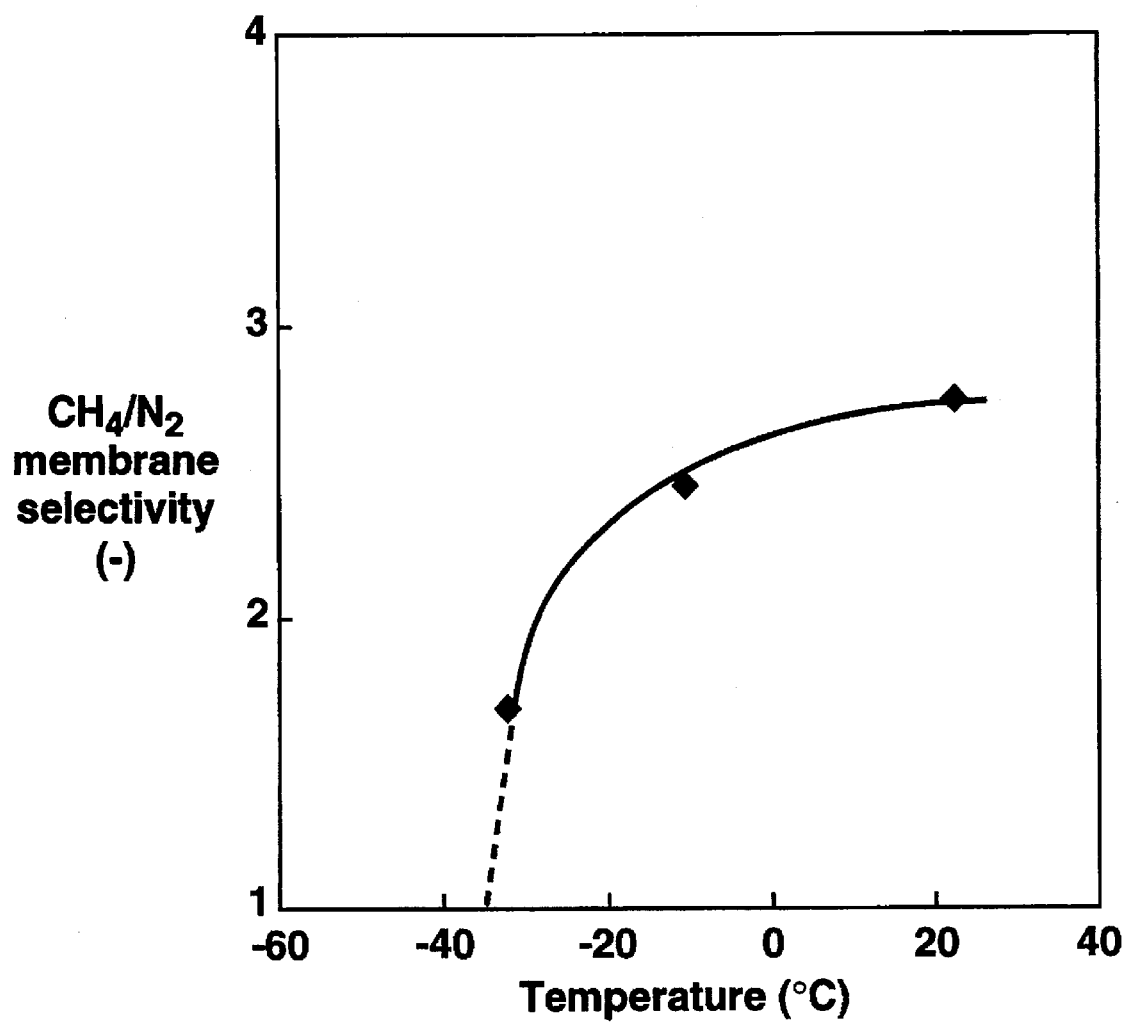
FIG. 8 is a graph of methane/nitrogen selectivity as a function of feed temperature for a Pebax 2533 membrane.

An experiment was carried out to determine the performance of a Pebax membrane at different temperatures. Pebax is a polyamide-polyether block copolymer that is rubbery at room temperature and that was believed to have a glass-transition temperature below −50° C. From earlier experiments, it was known that this material has a methane/nitrogen selectivity in the range 2–4 at room temperatures. Pebax membranes were prepared as in Example 4, and were subjected to mixed-gas permeation tests as in Example 6. The pressure-normalized fluxes of propane, methane, and nitrogen, and the propane/nitrogen, propane/methane, and methane/nitrogen selectivities were calculated using an in-house computer program. Flux and selectivity results are shown in FIGS. 7 and 8.

Surprisingly, the pressure-normalized fluxes of all three components decrease with decreasing temperature, and the loss of methane permeability was more severe than the loss of nitrogen permeability. As a result, the methane/nitrogen selectivity decreased from close to 3 at room temperature to only about 1.8, and failing, at −30° C. This decrease must be due to the membrane becoming more glassy in character as the temperature falls. It appears that the glass-transition temperature of this polymer is probably around −40° C. or −50° C., and that even 30° C. or 40° C. above the transition, the "glassy", diffusion-controlled effects are beginning to dominate the solubility effects. This polymer is, therefore, not suitable for use in methane/nitrogen separation as described here and is outside the scope of the invention.

Example 8

Effect of Feed Temperature on PTMSP Films

Figure 9:
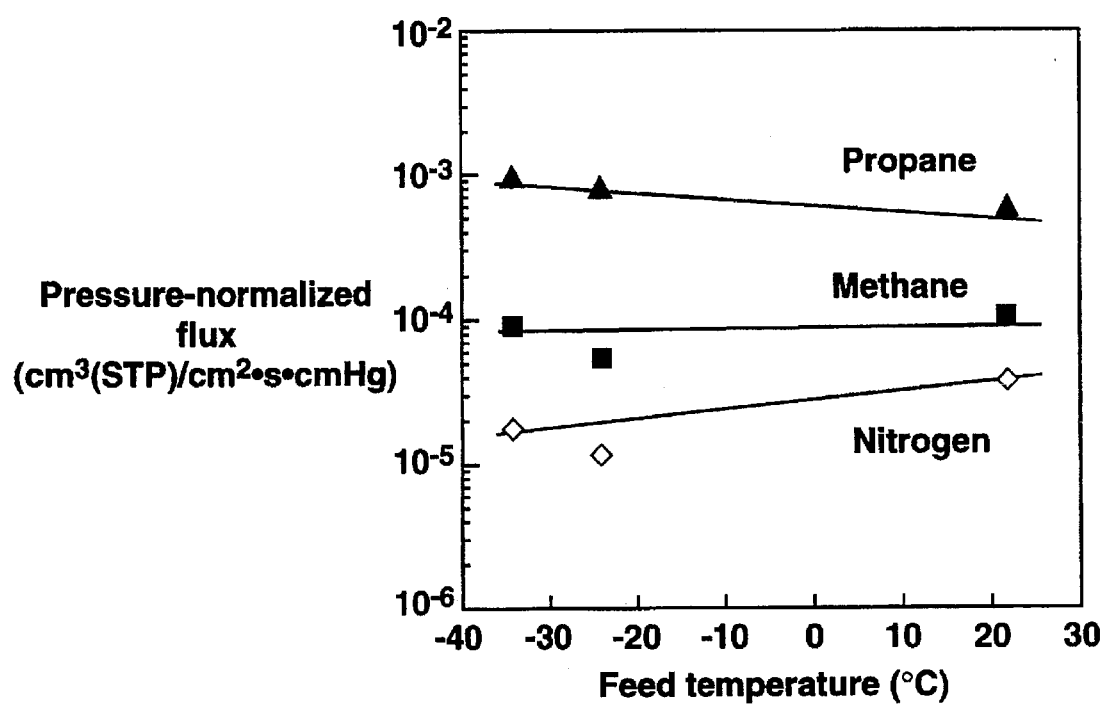
FIG. 9 is a graph of pressure-normalized flux as a function of feed temperature for permeation of propane, methane and nitrogen through a PTMSP membrane.
Figure 10:
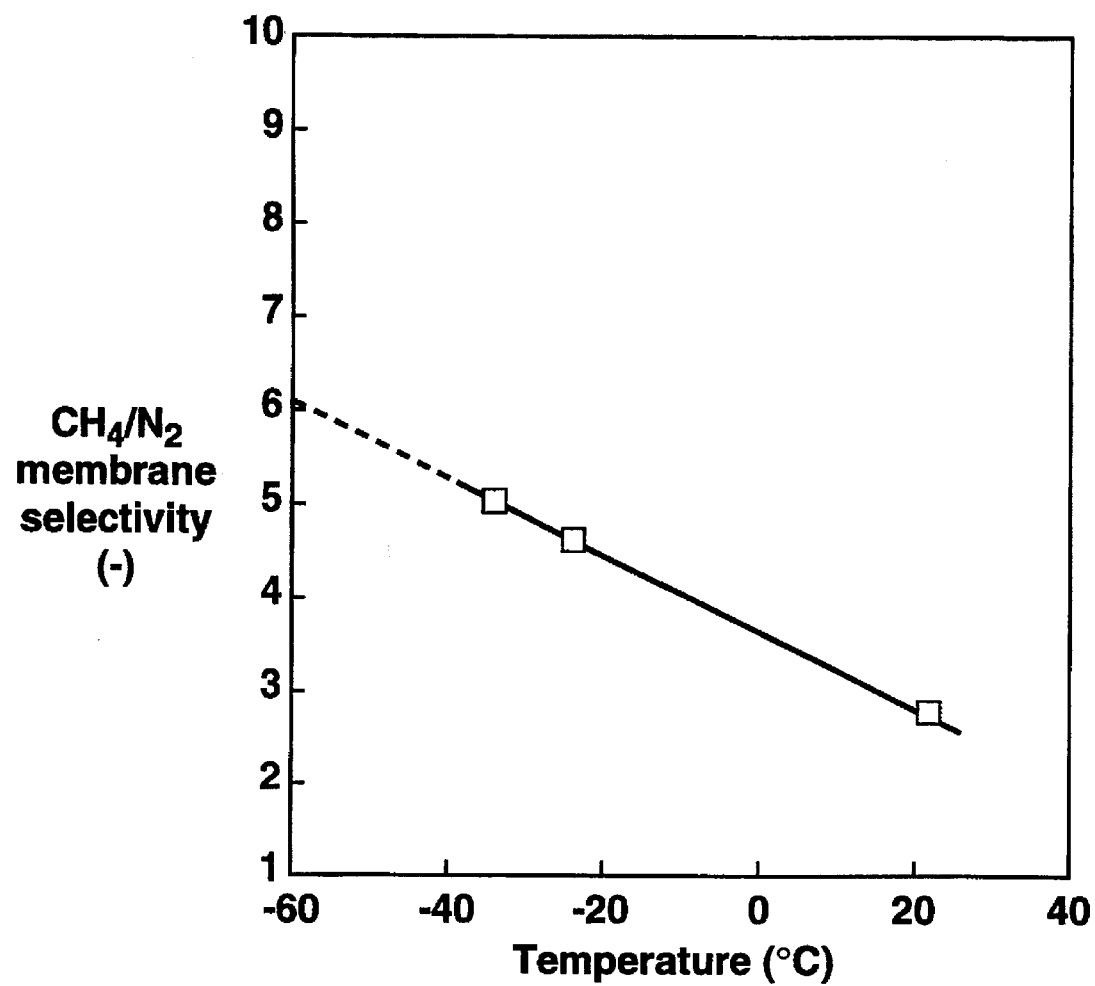
FIG. 10 is a graph of methane/nitrogen selectivity as a function of feed temperature for a PTMSP membrane.

An experiment was carried out to determine the performance of a PTMSP film at different temperatures. PTMSP films were prepared as in Example 5, and were subjected to mixed-gas permeation tests as in Example 6. These films were tested at temperatures of 23° C., −26° C. and −34° C. The pressure-normalized fluxes of propane, methane, and nitrogen, and the propane/nitrogen, propane/methane, and methane/nitrogen selectivities were calculated using an in-house computer program. Flux and selectivity results are shown in FIGS. 9 and 10.

The pressure-normalized flux of propane increases as the temperature falls. Propane is condensable and sorbs strongly into the free-volume of PTMSP, especially at lower temperatures. The methane flux remains fairly constant at about $1\times10^{-4}$ cm$^3$(STP)/cm$^2$.s.cmHg over the temperature range. The nitrogen flux falls from about $4\times10^{-5}$ cm$^3$(STP)/cm$^2$.s.cmHg to about $1.8\times10^{-5}$ cm$^3$(STP)/cm$^2$.s.cmHg, resulting in a rise in selectivity from 2.8 at 23° C. to about 5 at −34° C. As can be seen from FIG. 10, lower temperatures would result in higher selectivities of 6 or more.

Examples 9 and 10 are calculations showing how the process of the invention can be used alone or integrated with other gas treatment methods.

Example 9

A calculation was performed to illustrate the performance of the process of FIG. 1. The process was assumed to be treating a gas mixture of 50 MMscfd natural gas at 1,000 psia. The composition of the gas was chosen to represent either a good quality natural gas (except for nitrogen content) or a gas that has already been pretreated, such as by amine absorption to reduce acid gas content and/or by glycol dehydration to reduce water vapor content.

The membrane separation step was assumed to be carried out at −30° C., using a composite membrane with a siloxane rubber selective layer. The selectivities of the various gas components with respect to nitrogen at that temperature, and the transmembrane pressure-normalized fluxes, were assumed to be as shown in Table 4. The pressure on the permeate side of the membrane was assumed to be 20 psia. The membrane area needed to perform the separation was calculated to be 270 m$^2$.

TABLE 4

| Component | Flux ($10^{-6}$ cm$^3$(STP)/CM$^2$ · s · cmHg) | Selectivity (Gas/N$_2$) |
|---|---|---|
| CH$_4$ | 500 | 5 |
| N$_2$ | 100 | 1 |
| CO$_2$ | 1,500 | 15 |
| H$_2$S | 2,500 | 25 |
| C$_4$ | 1,600 | 16 |
| C$_6$ | 4,000 | 40 |
| H$_2$O | 5,000 | 50 |

The calculations were carried out using a custom-designed in-house computer modeling program, based on cross-flow configuration in a spiral-wound membrane module. The stream compositions as calculated are given in Table 5.

TABLE 5

| Component (vol %) | Stream number (FIG. 1) | | | | | Remixed gas 5 + 8 |
|---|---|---|---|---|---|---|
| | 3 | 4 | 5 | 7 | 8 | |
| CH$_4$ | 75.0 | 70.2 | 83.1 | − | 98.2 | 88.3 |
| N$_2$ | 20.0 | 28.5 | 5.5 | 100 | − | 2.5 |
| CO$_2$ | 0.025 | 0.0087 | 0.053 | − | 0.012 | 0.029 |
| H$_2$S | 0.0002 | − | 0.0005 | − | − | 0.0002 |
| C$_4$ | 4.0 | 1.27 | 8.67 | − | 1.78 | 4.7 |
| C$_6$ | 1.0 | 0.041 | 2.64 | − | 0.057 | 1.2 |
| H$_2$O | 0.010 | 0.0002 | 0.027 | − | 0.0002 | 0.012 |
| Flow (1,000 scfm) | 34.7 | 21.9 | 12.8 | 6.2 | 15.7 | 28.5 |

−means less than 0.0001 or none

As can be seen from the table:

Stream 4, the residue stream from the membrane separation step, contains 2 ppm water vapor, less than 1 ppm hydrogen sulfide and 87 ppm carbon dioxide. This stream needs no additional treatment before it can be sent to the cryogenic unit.

The flow rate of stream 4 is 63% of the flow rate of stream 3. The cryogenic unit can, therefore, treat 50% more gas than would be possible in the absence of the membrane unit.

Stream 5 contains 5.5% nitrogen. This is above pipeline specification. When stream 5 is mixed with stream 8 from the cryogenic unit, however, the result is a stream that meets pipeline specification. No methane whatsoever has been lost in this process and the only secondary product is the clean nitrogen stream from the top of the cryogenic distillation column.

The stage-cut of the membrane process is 37% (12.8/34.7).

In this calculation, setting the permeate pressure to 20 psia would result in a relatively high recompression cost to raise the pressure of stream 5 for remixing with stream 8. Optionally, the recompression requirements could be reduced by maintaining a higher pressure on the permeate side, such as 50 psia or 100 psia, for example. The trade-off would be that a larger membrane area is required to perform the separation.

Example 10

A calculation was performed to illustrate the performance of the process of FIG. 1 in conjunction with other separation technology. The process was assumed to be treating a gas mixture of 50 MMscfd natural gas at 1,000 psia. The composition of the gas was chosen to contain an excess of both acid gases [carbon dioxide (3%), hydrogen sulfide ((10 ppm)] and nitrogen (20%).

Figure 4:
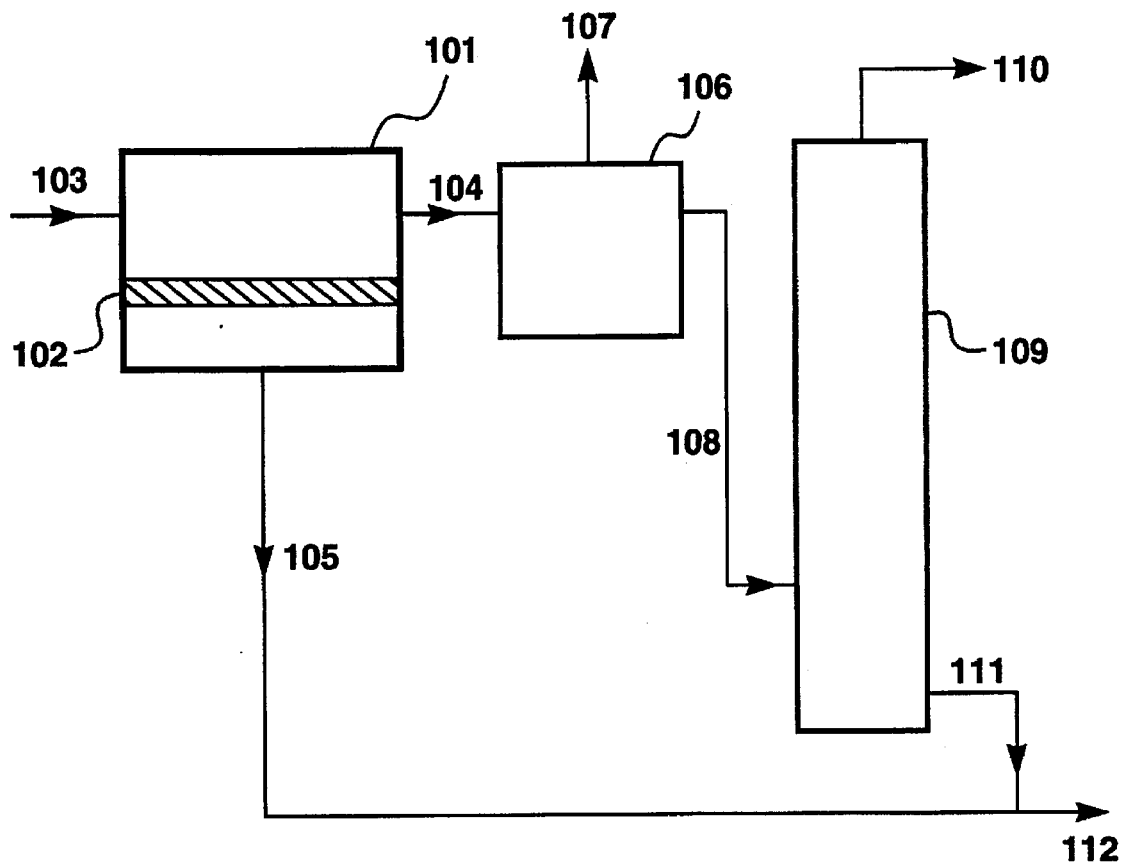
FIG. 4 is a schematic drawing illustrating the process of the invention used in conjunction with molecular sieving.

As in Example 9, the membrane separation step was assumed to be carried out at −30° C., using a composite membrane with a siloxane rubber selective layer. The selectivities and fluxes of the various gas components were assumed to be as in Table 4, and the pressure on the permeate side to be 20 psia. For a gas of the composition of this example, one method of treating would be to remove the acid gases to specification in an upstream amine plant and then proceed as in Example 9, using a process design as in FIG. 1. An alternative scheme is shown in FIG. 4. Referring now to FIG. 4, membrane unit 101 contains a membrane 102. Feed stream 103, with the composition shown below, passes across the feed side of the membrane. Transmembrane permeation occurs because the permeate side of the membrane is at a lower pressure than the feed side. Residue stream 104, enriched in nitrogen and depleted in methane and the other component compared with stream 103, is withdrawn from the feed side. Permeate stream 105, enriched in methane and the other components and depleted in nitrogen compared with stream 103, is withdrawn from the permeate side of membrane 102. Residue stream 104 contains essentially no hydrogen sulfide, but still contains 5,800 ppm carbon dioxide. The excess carbon dioxide is removed by passing residue stream 104 through a small molecular sieve, 106. Carbon dioxide can be withdrawn from the sieve as stream 107. The remainder of the stream passes on as stream 108 to the cryogenic distillation unit 109 for further separation of nitrogen from methane. Bottom stream 111 from the distillation unit is the methane stream. Overhead stream 110 is the nitrogen stream. Stream 111 and 105 are remixed to yield a product gas 112.

The calculations of the stream compositions were carried out as in Example 9, on the basis of the process design shown in FIG. 4. The membrane area needed to perform the separation in this case was calculated to be 370 m$^2$, and the stage-cut was 50%. The stream compositions as calculated are given in Table 6.

TABLE 6

| Component (vol %) | Stream number (FIG. 4) | | | | | | |
|---|---|---|---|---|---|---|---|
| | 103 | 104 | 105 | 108 | 110 | 111 | 112 |
| CH$_4$ | 72.0 | 64.6 | 79.3 | 65.0 | — | 99.1 | 87.1 |
| N$_2$ | 20.0 | 34.2 | 6.0 | 34.4 | 100 | — | 3.61 |
| CO$_2$ | 3.0 | 0.58 | 5.4 | — | — | — | 3.27 |
| H$_2$S | 0.001 | — | 0.0019 | — | — | — | 0.0012 |
| C$_4$ | 4.0 | 0.66 | 7.30 | 0.66 | — | 1.0 | 4.82 |
| C$_6$ | 1.0 | 0.006 | 1.98 | 0.006 | — | 0.009 | 1.20 |
| H$_2$O | 0.01 | — | 0.02 | — | — | — | 0.012 |
| Flow (1,000 scfm) | 34.7 | 17.3 | 17.4 | 17.2 | 5.9 | 11.3 | 27.7 |

— means less than 0.0001 or none

As can be seen from the table, the product stream 112 remains over specification in hydrogen sulfide and carbon dioxide. Thus, in this case the gas stream would need dilution with clean gas from another source or some supplementary treatment before entering the pipeline.

I claim:

1. A process for treating a gas stream comprising methane, nitrogen and at least one other component, said process comprising the following steps:
   (a) providing a membrane having a feed side and a permeate side and being selective for both methane and said other component over nitrogen;
   (b) passing said gas stream across said feed side of said membrane at a temperature at which said membrane exhibits a selectivity for methane over nitrogen of at least about 5;
   (c) withdrawing from said feed side a residue stream depleted in both methane and said other component and enriched in nitrogen compared with said gas stream;
   (d) withdrawing from said permeate side a permeate stream enriched in both methane and said other component and depleted in nitrogen compared with said gas stream;
   (e) subjecting said residue stream to cryogenic separation of nitrogen from methane.

2. The process of claim 1, wherein said other component comprises water.

3. The process of claim 1, wherein said other component comprises carbon dioxide.

4. The process of claim 1, wherein said other component comprises a C$_{3+}$ hydrocarbon.

5. The process of claim 1, wherein said other component comprises an aromatic hydrocarbon.

6. The process of claim 1, wherein said membrane is operated at a stage-cut of at least about 30%.

7. The process of claim 1, wherein said membrane is operated at a stage-cut of at least about 40%.

8. The process of claim 1, wherein said membrane is operated at a stage-cut of at least about 50%.

9. The process of claim 1, wherein said membrane comprises a rubbery polymer.

10. The process of claim 1, wherein said membrane comprises a rubbery polymer having a glass transition temperature below about $-50°$ C.

11. The process of claim 1, wherein said membrane comprises a rubbery polymer having a glass transition temperature below about $-80°$ C.

12. The process of claim 1, wherein said membrane comprises a rubbery polymer having a glass transition temperature below about $-100°$ C.

13. The process of claim 1, wherein said membrane comprises a siloxane polymer comprising repeating units having the structure:

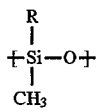

wherein R is an alkyl group having one to eight carbon atoms.

14. The process of claim 1 wherein said membrane comprises silicone rubber.

15. The process of claim 1, wherein said membrane comprises a polymer material characterized by:
   (a) a glass transition temperature of at least about $100°$ C.;
   (b) a free volume of at least about 10%; and
   (c) a methane permeability at room temperature of at least about 1,000 Barrer.

16. The process of claim 15, wherein said polymer material is a substituted polyacetylene.

17. The process of claim 15, wherein said polymer material is polytrimethylsilylpropyne.

18. The process of claim 1, wherein said temperature is in the range $0°$ C. to $-100°$ C.

19. The process of claim 1, wherein said temperature is in the range $-20°$ C. to $-70°$ C.

20. The process of claim 1, wherein said temperature is no lower than about $-60°$ C.

21. The process of claim 1, wherein said temperature is no lower than about $-50°$ C.

22. The process of claim 1, wherein said membrane is maintained at a temperature at which it exhibits a selectivity for methane over nitrogen of at least about 5.5.

23. The process of claim 1, wherein said membrane is maintained at a temperature at which it exhibits a selectivity for methane over nitrogen of at least about 6.

24. The process of claim 1, wherein said membrane exhibits a transmembrane methane pressure-normalized flux of at least about $1 \times 10^{-5}$ cm$^3$(STP)/cm$^2$.s.cmHg.

25. The process of claim 1, wherein said membrane exhibits a transmembrane methane pressure-normalized flux of at least about $1 \times 10^{-5}$ cm$^3$(STP)/cm$^2$.s.cmHg.

26. The process of claim 1, wherein said gas stream contains at least about 10% nitrogen.

27. The process of claim 1, wherein said gas stream contains at least about 20% nitrogen.

28. The process of claim 1, wherein said permeate stream contains less than about 4% nitrogen.

29. The process of claim 1, wherein said permeate stream contains less than about 8% nitrogen.

30. The process of claim 1, wherein said gas stream further comprises at least one gas chosen from the group consisting of water, carbon dioxide and C$_{3+}$ hydrocarbons, and wherein said gas stream is treated to remove at least a portion of said at least one gas before said gas stream passes across said feed side.

31. The process of claim 1, wherein said gas stream further comprises at least one C$_{3+}$ hydrocarbon and said process further comprises recovering at least a portion of said C$_{3+}$ hydrocarbon by subjecting said gas stream to condensation before said gas stream passes across said feed side.

32. The process of claim 1, wherein said residue stream is subjected to a supplementary treatment step to remove at least a portion of said other component before being subjected to said cryogenic separation.

33. The process of claim 1, wherein said permeate stream is subjected to a supplementary treatment step to remove at least a portion of said other component.

34. The process of claim 1, wherein said cryogenic separation produces a methane-rich stream and said permeate stream is mixed with said methane-rich stream to produce a methane product stream.

35. The process of claim 34, wherein said methane product stream is sent to a gas pipeline.

36. The process of claim 34, wherein said methane product stream is subjected to a supplementary treatment step to remove at least a portion of said other component.

37. A process for treating natural gas containing an excess of nitrogen, and at least one secondary contaminant chosen from the group consisting of water, carbon dioxide and $C_{3+}$ hydrocarbons, by cryogenically separating nitrogen from methane, said process comprising the following steps:

(a) providing a cryogenic separation unit;

(b) positioning upstream of said cryogenic separation unit a membrane separation unit selectively permeable to methane and said at least one secondary contaminant over nitrogen, said membrane separation unit being connected to said cryogenic separation unit such that a residue stream from said membrane separation unit can pass to said cryogenic separation unit;

(c) using said membrane separation unit to create a permeate stream, containing at least a portion of said at least one secondary contaminant, that bypasses said cryogenic separation unit, and said residue stream, depleted in said at least one secondary contaminant, that passes to said cryogenic separation unit;

(d) using said cryogenic separation unit to create a methane-rich stream from which nitrogen has been substantially removed;

(e) mixing said permeate stream with said methane-rich stream to create a treated natural gas product stream.

38. The process of claim 37, wherein said treated natural gas product stream meets pipeline specification for said at least one secondary contaminant.

39. The process of claim 37, wherein said at least one secondary contaminant is water.

40. The process of claim 37, wherein said at least one secondary contaminant is carbon dioxide.

41. The process of claim 37, wherein said at least one secondary contaminant is a $C_{3+}$ hydrocarbon.

42. The process of claim 37, wherein said membrane unit is operated at a stage-cut of at least about 30%.

43. The process of claim 37, wherein said membrane unit contains a membrane comprising a rubbery polymer having a glass transition temperature below about $-100°$ C.

44. The process of claim 37, wherein said membrane unit contains a membrane comprising a substituted polyacetylene.

45. The process of claim 37, wherein step (c) is carried out at a temperature no lower than about $-60°$ C.

46. The process of claim 37, wherein said membrane unit contains a membrane that provides a transmembrane methane pressure-normalized flux of at least about $1 \times 10^{-5}$ cm$^3$(STP)/cm$^2$.s.cmHg.

47. The process of claim 37, wherein said natural gas contains at least about 10% nitrogen.

48. The process of claim 37, wherein said natural gas contains at least about 20% nitrogen.

49. The process of claim 37, wherein said permeate stream contains less than about 4% nitrogen.

50. The process of claim 37, wherein said permeate stream contains less than about 8% nitrogen.

51. The process of claim 37, wherein said natural gas is treated to remove at least a portion of said at least one secondary contaminant prior to step (c).

52. The process of claim 37, wherein said residue stream is subjected to a supplementary separation step to remove at least a portion of said at least one secondary contaminant prior to step (d).

53. The process of claim 37, wherein said treated natural gas product stream is sent to a gas pipeline.

54. The process of claim 37, wherein said treated natural gas product stream is subjected to a supplementary separation step to remove at least a portion of said at least one secondary contaminant.

55. A gas-treating apparatus comprising:

(a) a cryogenic separation unit adapted to separate nitrogen from methane;

(b) a membrane separation unit positioned upstream of said cryogenic separation unit, connected to said cryogenic separation unit such that a residue gas stream from said membrane separation unit can pass to said cryogenic separation unit for separation of nitrogen from methane; said membrane separation unit being characterized in that it contains a membrane that exhibits, at a temperature no lower than about $-70°$ C.:

(i) a selectivity for methane over nitrogen of at least about 5, (ii) a transmembrane methane pressure-normalized flux of at least about $1 \times 10^{-5}$ cm$^3$(STP)/cm$^2$.s.cmHg, and (iii) a selectivity in favor of at least one other gas component over nitrogen.

56. The apparatus of claim 55, further comprising additional gas-treating means positioned upstream of said membrane separation unit, connected to said membrane separation unit such that a treated gas stream from said additional gas-treating means can pass to said membrane separation unit for treatment.

57. The apparatus of claim 56, wherein said additional gas-treating means is chosen from the group consisting of absorption means, adsorption means, condensation means and membrane separation means.

58. The apparatus of claim 55, further comprising additional gas-treating means connected to said membrane separation unit such that a permeate gas stream from said membrane separation unit can pass to said additional gas-treating means for treatment.

59. The apparatus of claim 58, wherein said additional gas-treating means is chosen from the group consisting of absorption means, adsorption means, condensation means and membrane separation means.

60. The apparatus of claim 55, further comprising additional gas-treating means positioned between said membrane separation unit and said cryogenic separation unit, and connected to said membrane separation unit such that a residue gas stream from said membrane separation unit can pass to said additional gas-treating means for treatment, and a treated stream from said additional gas-treating means can pass to said cryogenic separation unit for separation of nitrogen from methane.

61. The apparatus of claim 60, wherein said additional gas-treating means is chosen from the group consisting of absorption means, adsorption means, condensation means and membrane separation means.

62. The apparatus of claim 55, further comprising means whereby a permeate stream from said membrane separation unit and a methane-rich stream from said cryogenic separation unit can be combined.

63. A process for treating a gas stream comprising methane, nitrogen and at least one other component, said process comprising the following steps:
  (a) providing a first membrane having a first feed side and a first permeate side and being selective for both methane and said at least one other component over nitrogen;
  (b) passing said gas stream across the first feed side at a temperature at which said first membrane exhibits a selectivity for methane over nitrogen of at least about 5;
  (c) withdrawing from said first feed side a first residue stream depleted in both methane and said at least one other component and enriched in nitrogen compared with said gas stream;
  (d) withdrawing from said first permeate side a first permeate stream enriched in both methane and said at least one other component and depleted in nitrogen compared with said gas stream;
  (e) providing a second membrane having a second feed side and a second permeate side and being selective for methane and said at least one other component over nitrogen;
  (f) passing said first residue stream across the second feed side;
  (g) withdrawing from said second feed side a second residue stream depleted in methane and said at least one other component and enriched in nitrogen compared with said first residue stream;
  (h) withdrawing from said second permeate side a second permeate stream enriched in methane and said at least one other component and depleted in nitrogen compared with said first residue stream;
  (i) subjecting said second residue stream to cryogenic distillation for further separation of nitrogen from methane.

* * * * *